United States Patent
Panzarella et al.

(10) Patent No.: US 7,431,546 B2
(45) Date of Patent: Oct. 7, 2008

(54) DEVICE FOR SECURING A PERSONAL-TRANSPORT VEHICLE TO A MOUNTING SURFACE

(75) Inventors: Thomas A. Panzarella, Harleysville, PA (US); James B. Eldon, III, Barto, PA (US); David D. McClanahan, Harleysville, PA (US)

(73) Assignee: Cook Technologies, Inc., Green Lane, PA (US)

( * ) Notice: Subject to any disclaimer, the term of this patent is extended or adjusted under 35 U.S.C. 154(b) by 96 days.

(21) Appl. No.: 11/499,045

(22) Filed: Aug. 3, 2006

(65) Prior Publication Data

US 2006/0269378 A1    Nov. 30, 2006

Related U.S. Application Data

(62) Division of application No. 10/854,986, filed on May 27, 2004, now Pat. No. 7,108,466.

(60) Provisional application No. 60/547,514, filed on Feb. 25, 2004, provisional application No. 60/473,674, filed on May 27, 2003.

(51) Int. Cl.
*B60P 3/06* (2006.01)
(52) U.S. Cl. .......................................................... 410/7
(58) Field of Classification Search ............... 410/3, 410/4, 7, 19, 46, 66, 77, 80, 81, 101
See application file for complete search history.

(56) References Cited

U.S. PATENT DOCUMENTS

| | | | |
|---|---|---|---|
| 1,835,840 A | 12/1931 | Barclay | 296/65.04 |
| 2,101,210 A | 12/1937 | Barclay | 296/65 |
| 2,818,910 A | 1/1958 | Hawkins | 155/30 |
| 4,019,752 A | 4/1977 | Leon et al. | 280/179 |
| 4,060,271 A | 11/1977 | Williams | 296/65 |
| 4,062,209 A | 12/1977 | Downing et al. | 70/226 |
| 4,076,268 A | 2/1978 | Hart | 280/179 |
| 4,093,303 A | 6/1978 | Nelson | 296/65 |
| 4,103,934 A | 8/1978 | Arnholt et al. | 280/744 |
| 4,265,478 A | 5/1981 | Korsgaard | 296/65 |
| 4,325,576 A | 4/1982 | Guthrie | 296/65 |
| 4,389,056 A | 6/1983 | Tenniswood | 280/289 |
| 4,407,616 A | 10/1983 | Hinze | 410/3 |

(Continued)

FOREIGN PATENT DOCUMENTS

DE    3 423 646 A1    1/1986

(Continued)

*Primary Examiner*—H Gutman
(74) *Attorney, Agent, or Firm*—Synnestvedt & Lechner LLP

(57) ABSTRACT

A preferred embodiment of a device for securing a personal-transport vehicle to a mounting surface includes one of a plow bracket and a bracket member for mounting on one of the personal-transport vehicle and the mounting surface, and a receptacle for mounting on the other of the personal transport vehicle and the mounting surface and for mating with and receiving the one of a plow bracket and a bracket member. The receptacle includes a panel and a docking lever pivotally coupled to the panel and movable between a first position wherein docking lever retains the one of a plow bracket and a bracket member so that the receptacle and the one of a plow bracket and a bracket member remain in a mated condition, and a second position.

18 Claims, 20 Drawing Sheets

U.S. PATENT DOCUMENTS

| | | | | |
|---|---|---|---|---|
| 4,427,210 A | 1/1984 | Wevers | | 280/289 |
| 4,449,561 A | 5/1984 | Head | | 152/213 |
| 4,455,046 A | 6/1984 | Linderoth | | 296/65 |
| 4,457,551 A | 7/1984 | Anthony | | 296/65.04 |
| 4,475,762 A | 10/1984 | DeLong et al. | | 296/65 |
| 4,492,403 A | 1/1985 | Blomgren et al. | | 295/65 |
| 4,511,171 A | 4/1985 | Petersen | | 296/65 |
| 4,520,893 A | 6/1985 | Keough | | 180/326 |
| 4,538,825 A | 9/1985 | Delahoussaye et al. | | 280/242 |
| 4,623,289 A | 11/1986 | Apostolos | | 410/7 |
| 4,688,843 A | 8/1987 | Hall | | 296/65 |
| 4,690,364 A | 9/1987 | Constantin | | 248/503.1 |
| 4,729,573 A | 3/1988 | Davis | | 280/289 |
| 4,730,964 A | 3/1988 | Joyner | | 410/23 |
| 4,754,946 A | 7/1988 | Constantin | | 248/503.1 |
| 4,805,954 A | 2/1989 | Lazaroff | | 296/65.04 |
| 4,913,265 A | 4/1990 | Richards | | 188/32 |
| 4,966,392 A | 10/1990 | Featon et al. | | 280/801 |
| 4,973,022 A | 11/1990 | Mayland | | 248/503.1 |
| 5,044,845 A | 9/1991 | Baker, Jr. | | 410/3 |
| 5,122,024 A | 6/1992 | Stokes | | 414/462 |
| 5,186,585 A * | 2/1993 | Sousa et al. | | 410/9 |
| 5,344,265 A | 9/1994 | Ullman et al. | | 410/3 |
| 5,489,170 A | 2/1996 | Inoue et al. | | 410/7 |
| 5,628,595 A | 5/1997 | Harris | | 410/7 |
| 5,713,704 A | 2/1998 | Pommier et al. | | 410/9 |
| 6,224,131 B1 | 5/2001 | Shammout | | 296/68.1 |
| 6,231,283 B1 | 5/2001 | Stowers | | 410/8 |
| 6,352,396 B1 | 3/2002 | Budd et al. | | 410/8 |
| 6,474,916 B2 | 11/2002 | Constantin | | 410/7 |
| 6,685,403 B2 | 2/2004 | Constantin | | 410/7 |
| 6,692,215 B1 | 2/2004 | Panzarella et al. | | 414/462 |
| 6,837,666 B1 | 1/2005 | Panzarella et al. | | 414/462 |
| 7,104,740 B2 * | 9/2006 | Girardin | | 410/7 |
| 7,108,466 B2 * | 9/2006 | Panzarella et al. | | 410/7 |
| 7,229,238 B2 * | 6/2007 | Girardin et al. | | 410/7 |
| 2001/0024604 A1 * | 9/2001 | Budd et al. | | 410/7 |
| 2001/0031183 A1 * | 10/2001 | Budd et al. | | 410/7 |
| 2001/0055520 A1 * | 12/2001 | Budd et al. | | 410/7 |
| 2005/0019125 A1 * | 1/2005 | Panzarella et al. | | 410/7 |
| 2005/0214089 A1 | 9/2005 | Giardin | | 410/7 |
| 2005/0214090 A1 * | 9/2005 | Girardin et al. | | 410/7 |
| 2005/0238453 A1 | 10/2005 | Lemay | | 410/7 |

FOREIGN PATENT DOCUMENTS

DE          3423646 A1 *   1/1986

* cited by examiner

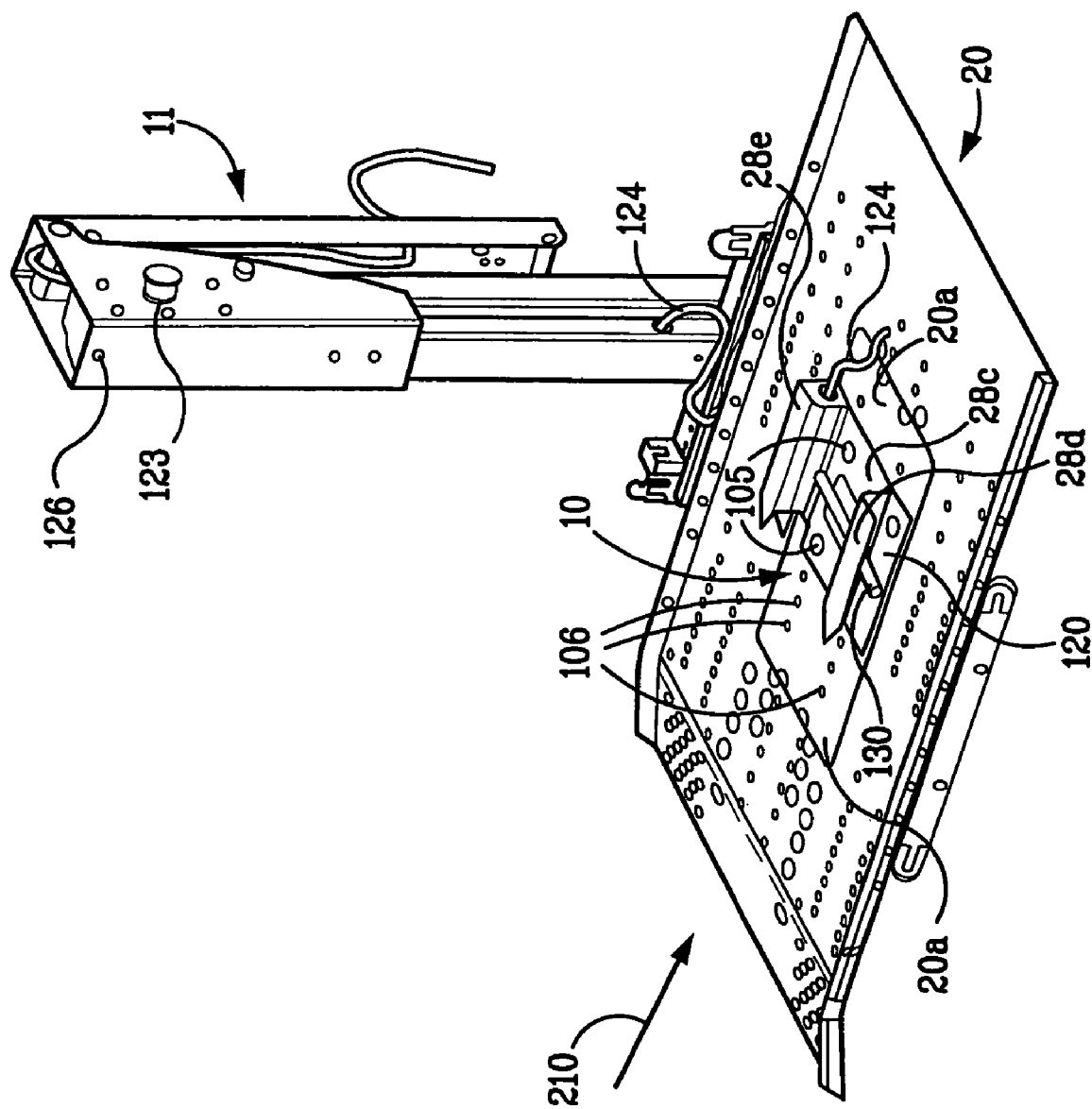

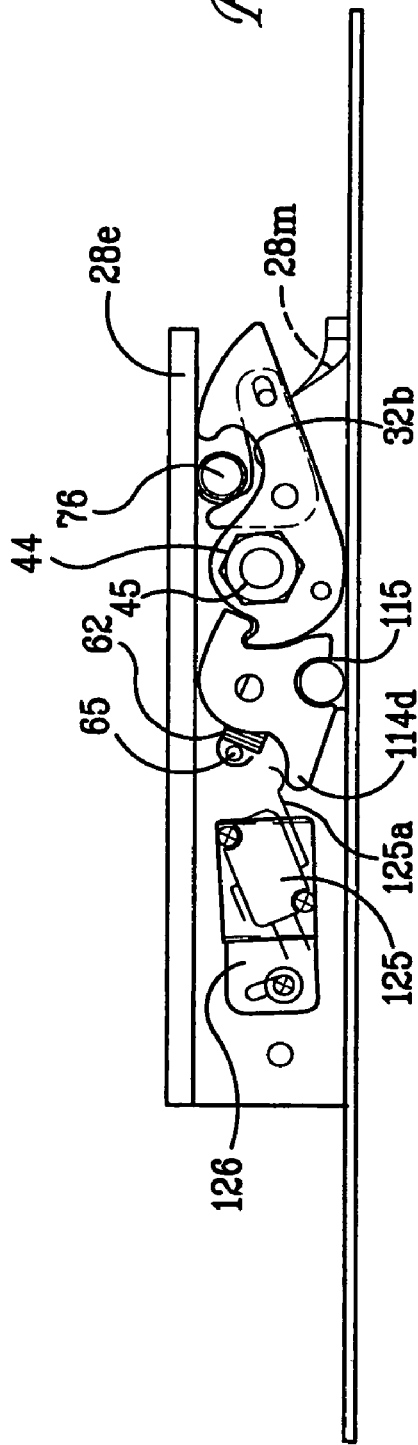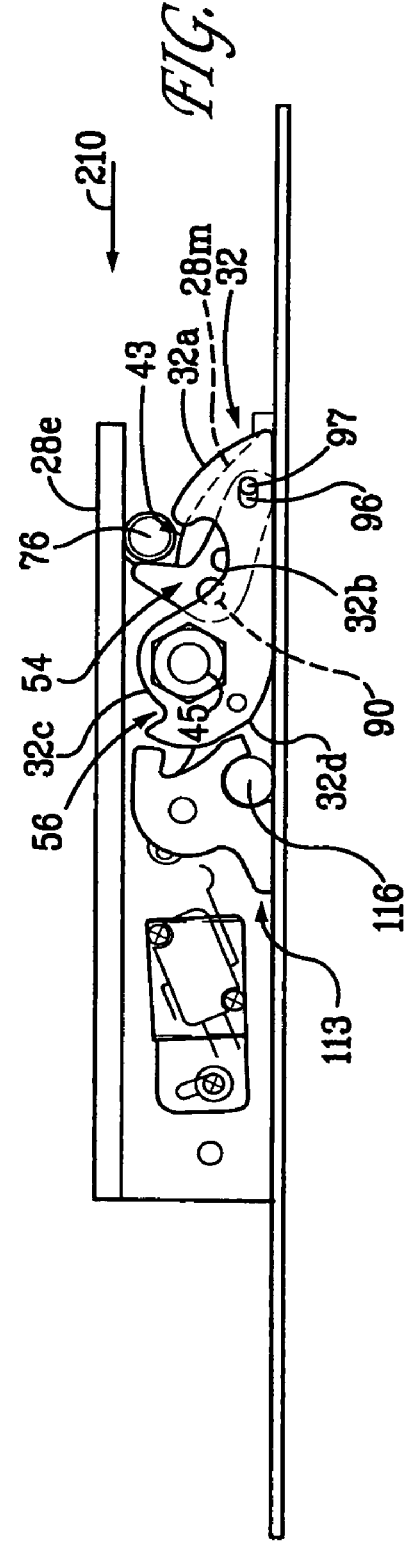

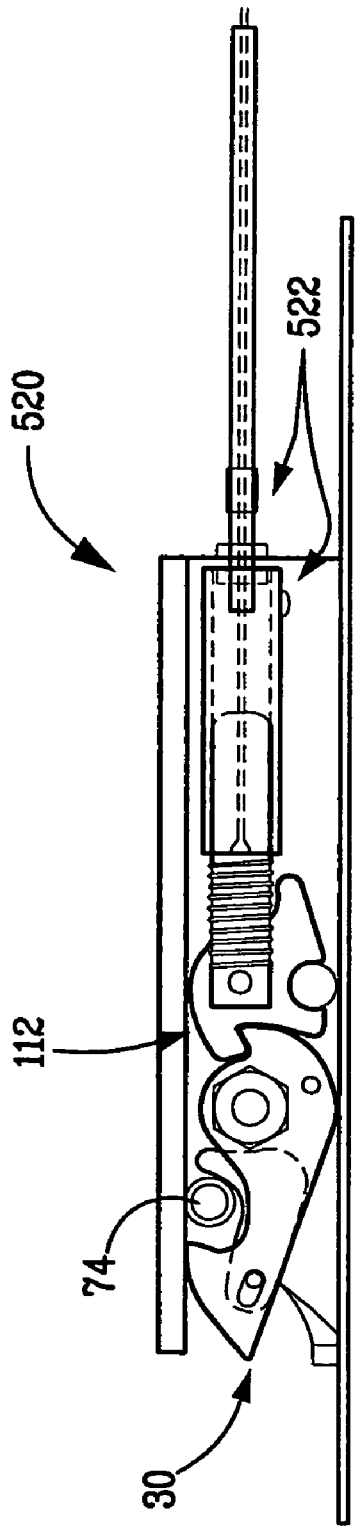
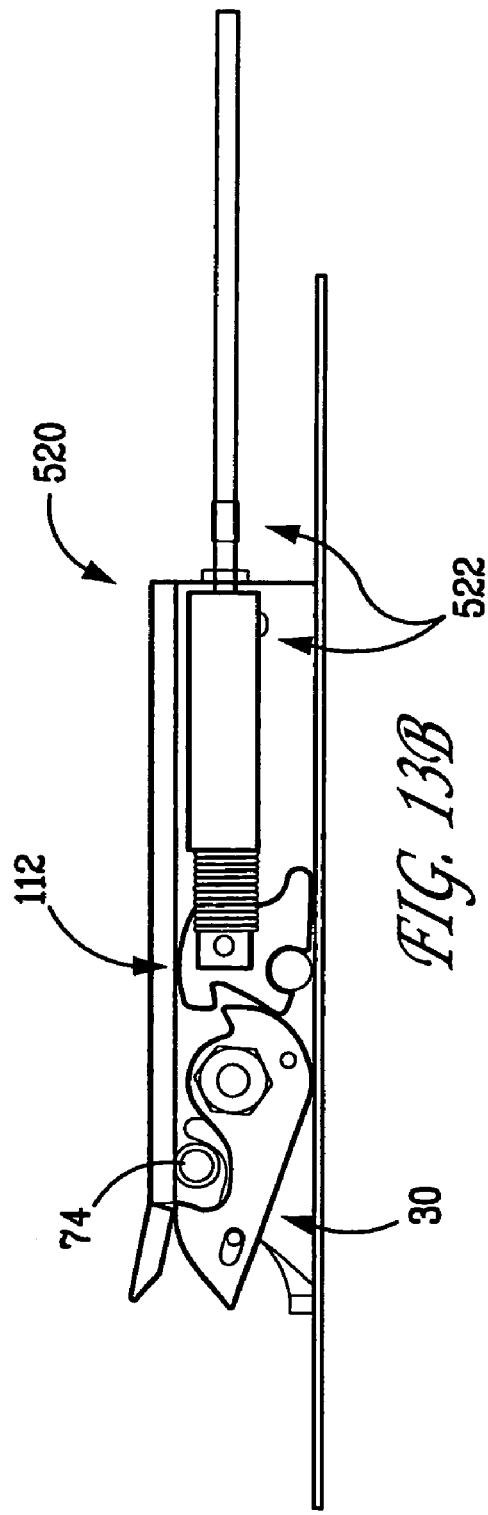

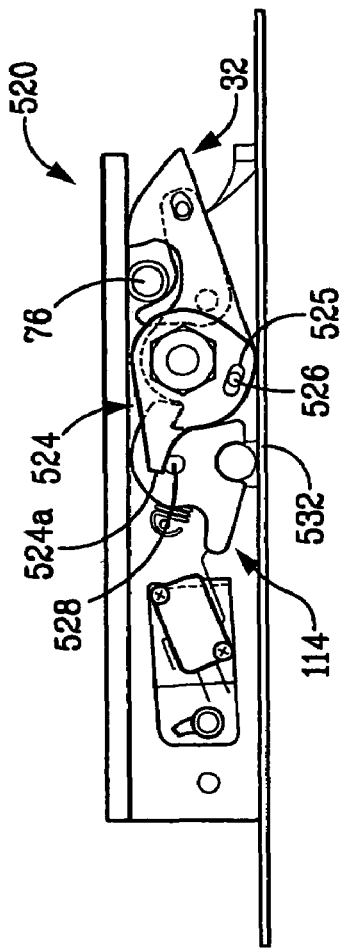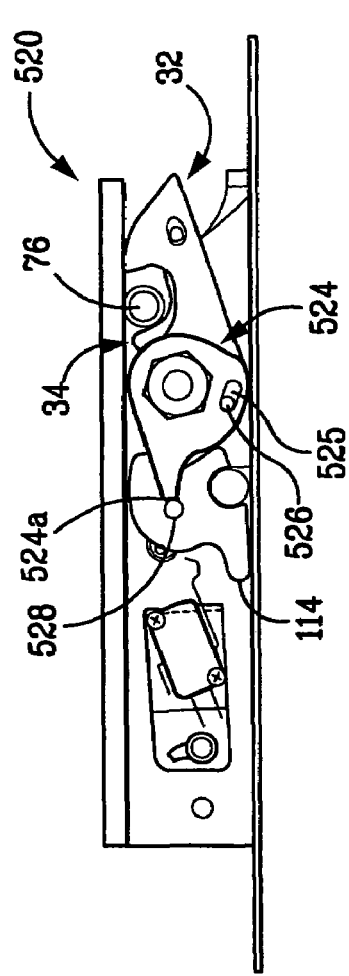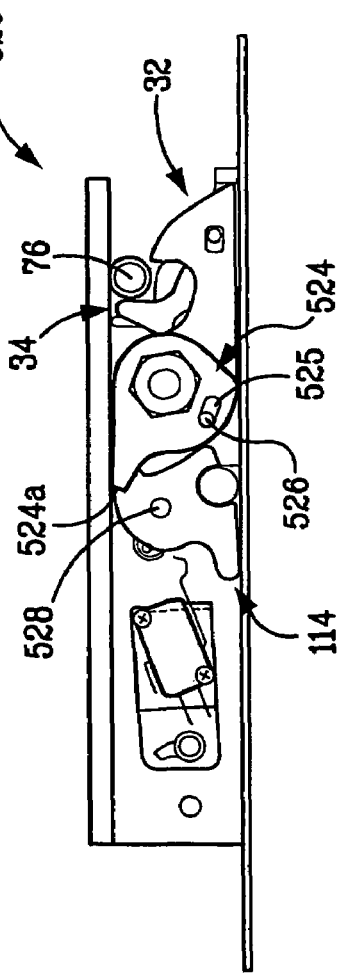

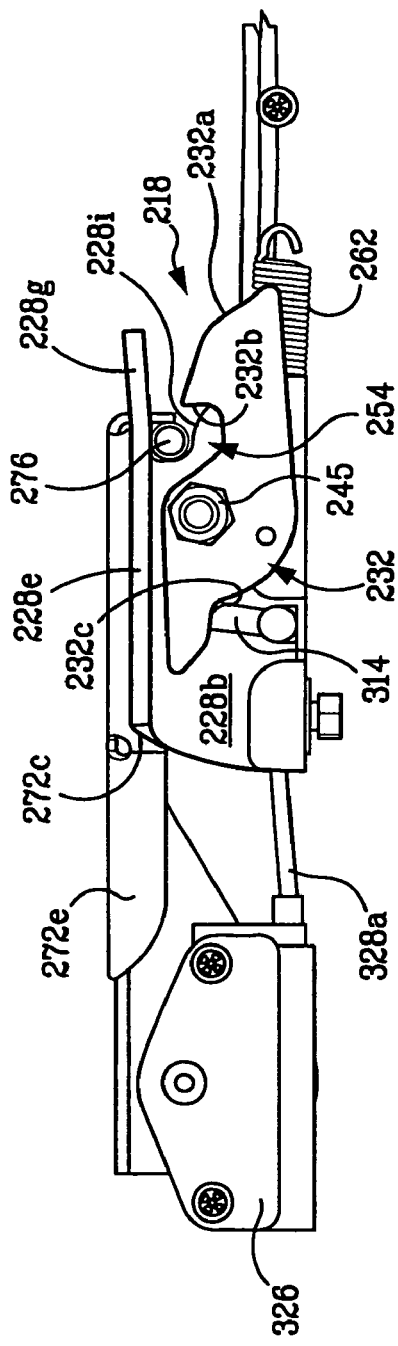
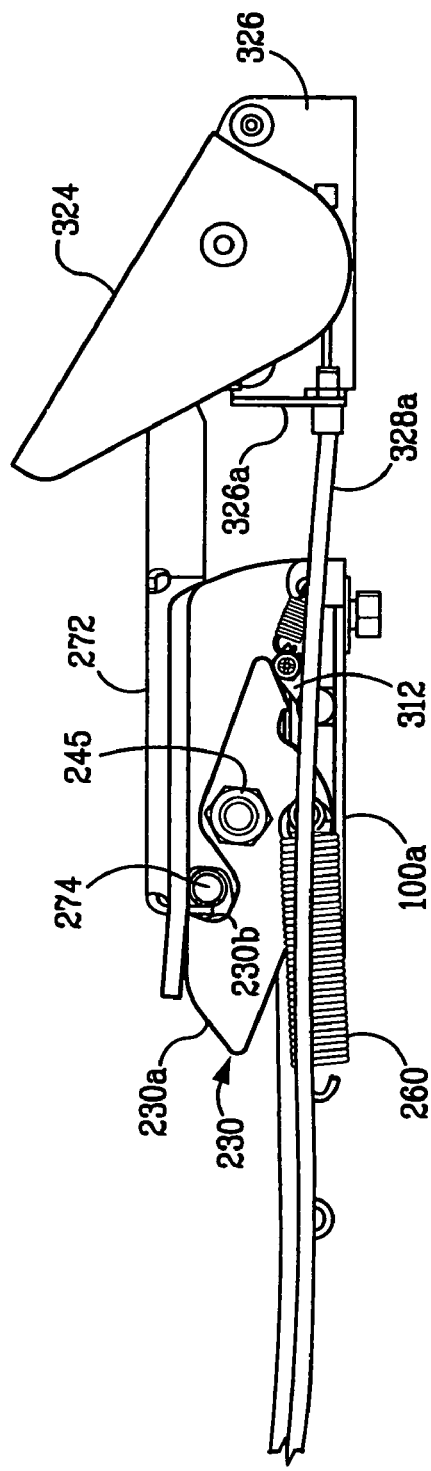
FIG. 23
FIG. 24

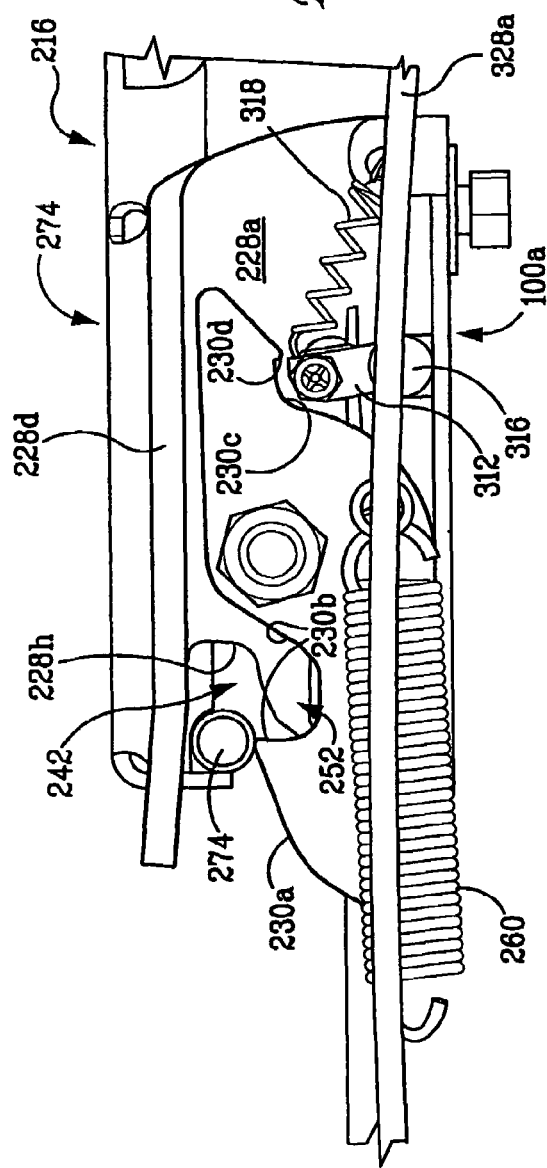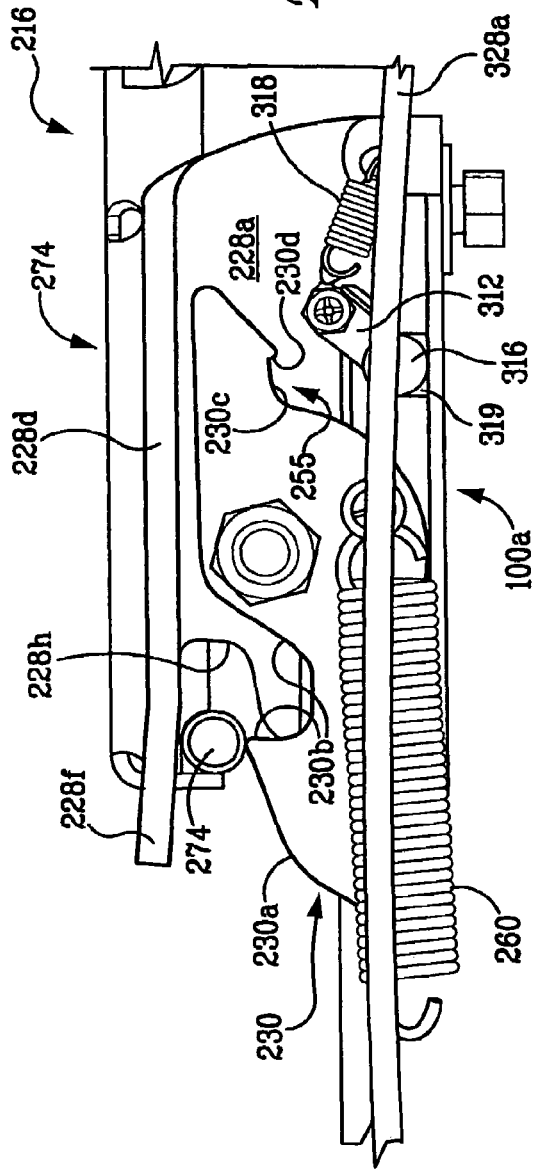

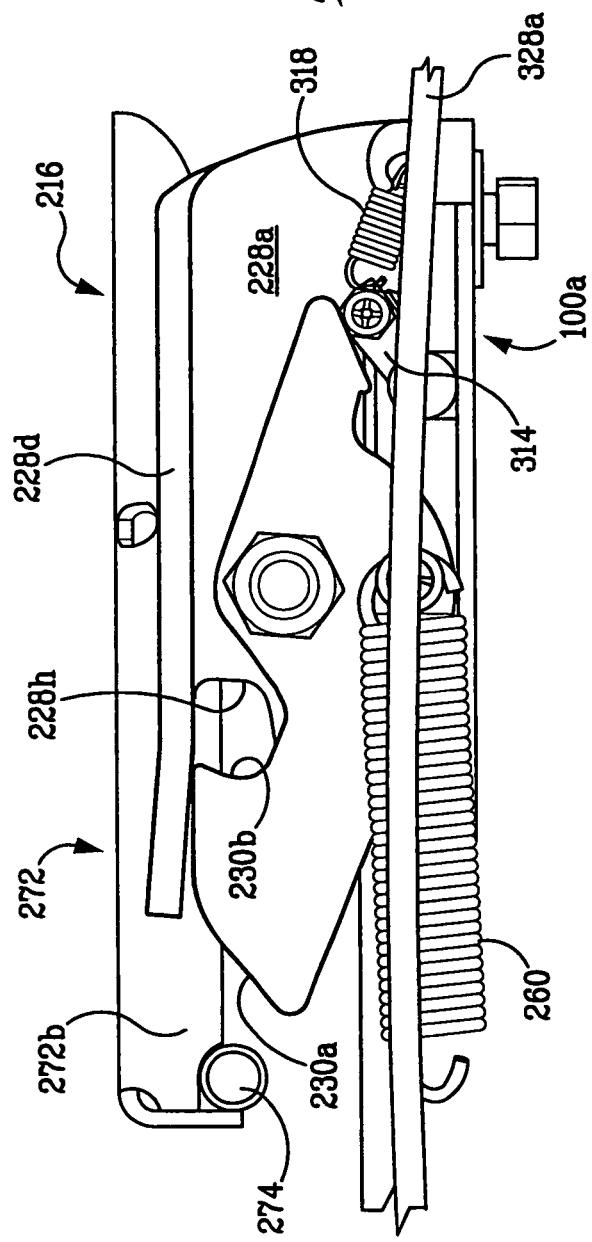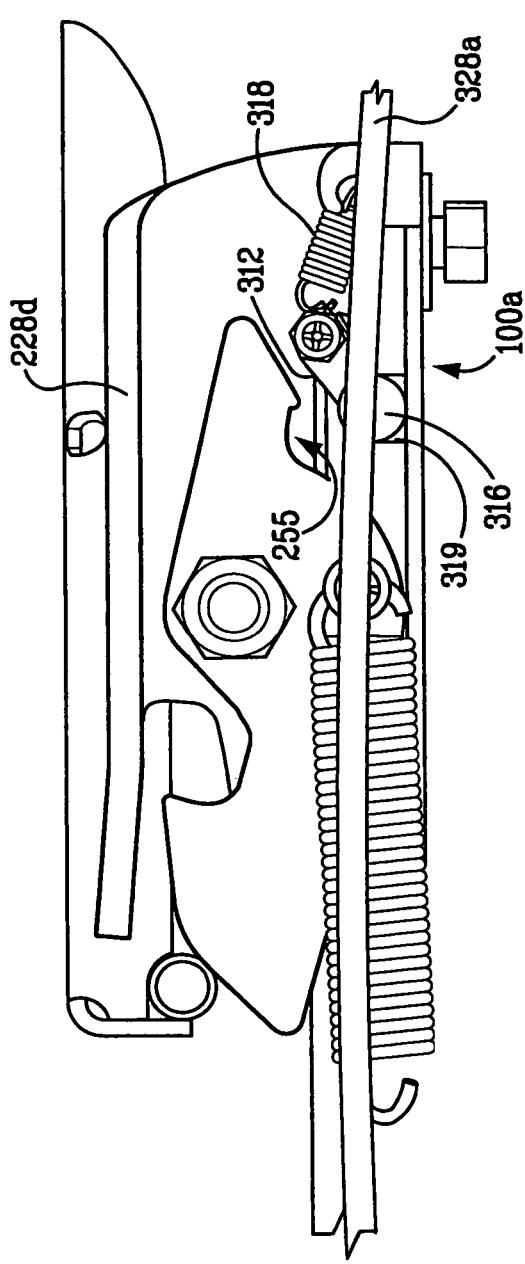

DEVICE FOR SECURING A PERSONAL-TRANSPORT VEHICLE TO A MOUNTING SURFACE

This application is a divisional of U.S. application Ser. No. 10/854,986, filed May 27, 2004 now U.S. Pat. No. 7,108,466, which is based on provisional application No. 60/473,674, filed May 27, 2003, and provisional application No. 60/547,514, filed Feb. 25, 2004. The contents of each of these applications is incorporated herein by reference in its entirety.

FIELD OF THE INVENTION

The present invention relates to a device for securing a personal-transport vehicle such as a power chair to a mounting surface such as a platform of a lift and carrier assembly.

BACKGROUND OF THE INVENTION

Personal-transport vehicles such as power chairs are commonly used by individuals with ambulatory difficulties or other disabilities. Various types of lift and carrier assemblies have been developed to facilitate the transportation of power chairs using passenger cars and other motorized vehicles. Lift and carrier assemblies are typically mounted on a trailer hitch or similar connecting point on the motorized vehicle. The power chair rides outside of the motorized vehicle on a platform or similar-type component of the lift and carrier assembly. The lift and carrier assembly typically includes provisions that permit the power chair to be driven onto the platform at ground level, and then lifted to prevent contact with the road surface during transport.

Lift and carrier assemblies usually include some type of mechanism that automatically secures the power chair in place during transport. For example, the lift and carrier assembly may be equipped with straps. Alternatively, the lift and carrier assembly may be equipped with a lever arm adapted to exert a substantial downward force on the power chair by way of a padded foot or other suitable member. The lever arm may be adapted to automatically rotate the foot into and out of contact with the power chair as the platform is moved between its upper and lower positions.

The use of a lever arm to secure the power chair requires that the power chair have a rigid surface that is within the range of motion of the securing foot. Moreover, the rigid surface must be able to withstand the substantial downward force exerted by the foot. Many contemporary personal-transport vehicles, e.g., power chairs, are typically not equipped with a surface that satisfies these requirements. Hence, securing devices that rely on a lever arm and foot are incompatible with many applications.

Another common means for securing a power chair to a lift and carrier assembly relies on a single, vertically-oriented pin and a receptacle adapted to receive the pin. The receptacle is typically fixed to the platform of the lift and carrier assembly, and the pin is fixed to the power chair. The receptacle is adapted to securely engage the pin when the power chair is in a predetermined position on the platform. The engagement of the pin and the receptacle secures the power chair to the platform.

The restraint provided by a single vertical pin may be unacceptable under certain circumstances. In particular, a single pin generally cannot prevent the power chair from rotating (swiveling) around the pin. This lack of restraint can result in the power chair moving from its stored position on the platform when the transporting vehicle turns at relatively high speed, brakes suddenly, or bounces in response to rough road conditions.

Moreover, the swiveling movement of the power chair, in extreme cases, can result in a potentially catastrophic separation of the power chair from the lift and carrier assembly.

Furthermore, the receptacle of the single-pin restraint is usually mounted in the center of the platform. Hence, the platform cannot be equipped with a ramp or other supporting surface positioned along the center thereof. This constraint precludes the use of the single-pin restraint with personal-transport devices comprising a centrally-located wheel, e.g., three-wheeled scooters. Also, the pin is usually not visible to the individual loading the power chair. Hence, the single-pin restraint does not provide a positive visual indication that the power chair has been properly secured to the lift and carrier assembly.

SUMMARY OF THE INVENTION

A preferred embodiment of a device for securing a personal-transport vehicle to a mounting surface comprises one of a plow bracket and a bracket member for mounting on one of the personal-transport vehicle and the mounting surface, and a receptacle for mating with the one of a plow bracket and a bracket member.

The receptacle comprises a yoke bracket for mounting on the other of the personal-transport vehicle and the mounting surface and receiving the one of a plow bracket and a bracket member. The receptacle also comprises a docking lever pivotally coupled to the yoke bracket and movable between a first position wherein the lever can securely engage the one of a plow bracket and a bracket member and thereby retain the receptacle and the one of a plow bracket and a bracket member in a mated condition, and a second position.

The device also comprises a pawl pivotally coupled to the yoke bracket so that the pawl can pivot between an engaged position wherein the pawl restrains the docking lever in the first position, and a disengaged position.

Another preferred embodiment of a device for securing a personal-transport vehicle to a mounting surface comprises one of a plow bracket and a bracket member for mounting on one of the personal-transport vehicle and the mounting surface, and a receptacle for mounting on the other of the personal transport vehicle and the mounting surface and for mating with and receiving the one of a plow bracket and a bracket member.

The receptacle comprises a panel and a docking lever pivotally coupled to the panel and movable between a first position wherein docking lever retains the one of a plow bracket and a bracket member so that the receptacle and the one of a plow bracket and a bracket member remain in a mated condition, and a second position.

Another preferred embodiment of a device for securing a personal-transport vehicle to a mounting surface comprises one of a plow bracket and a bracket member for mounting on one of the personal-transport vehicle and the mounting surface, and a receptacle for mating with the one of a plow bracket and a bracket member.

The receptacle comprises a yoke bracket for mounting on the other of the personal-transport vehicle and the mounting surface and receiving the one of a plow bracket and a bracket member. The receptacle also comprises a docking lever pivotally coupled to the yoke bracket and movable between a first position wherein the lever can securely engage the one of a plow bracket and a bracket member and thereby retain the receptacle and the one of a plow bracket and a bracket member in a mated condition, and a second position.

The device also comprises a pawl pivotable between a first and a second position. The pawl urges the docking lever from the first to the second position of the docking lever when the pawl pivots from the first to the second position of the pawl.

BRIEF DESCRIPTION OF THE DRAWINGS

The foregoing summary, as well as the following detailed description of a presently-preferred embodiment, is better understood when read in conjunction with the appended drawings. For the purpose of illustrating the invention, the drawings show an embodiment that is presently preferred. The invention is not limited, however, to the specific instrumentalities disclosed in the drawings. In the drawings:

FIG. 1A is a perspective view of a preferred embodiment of a device installed on a platform of a lift and carrier assembly, with wiring of the device routed internally to the lift and carrier assembly;

FIGS. 3A and 3B are side views of the device shown in FIGS. 2A-2E, from a perspective rotated approximately 180 degrees from the perspective of FIGS. 2A-2E, as the plow bracket is mated and unmated with the receptacle;

FIGS. 13A and 13B are side views of an alternative embodiment of the device shown in FIGS. 1A-4, depicting a second pawl of the device in an engaged and a disengaged position;

FIGS. 14A-14C are side views of the alternative embodiment of the device shown in FIGS. 13A and 13B, showing a toggle of the device in conditions restraining and releasing a second pawl of the device;

FIG. 23 is a side view of the receptacle, the release assembly, the pawl assembly, and the plow bracket shown in FIGS. 18-22, from a perspective 180-degrees reversed from that of FIG. 21, with a second pawl of the device shown in is first position, a second docking lever of the device shown in its releasing position, and the plow bracket fully inserted in the receptacle;

FIG. 24 is a side view of the receptacle, the release assembly, the pawl assembly, and the plow bracket shown in FIGS. 18-23, taken from the perspective of FIG. 22, with the release lever shown in its second position, the first pawl shown in its second position, the first docking lever arm in its locking position and securing a first trunnion of the plow bracket, and the plow bracket fully inserted in the receptacle;

FIG. 25 is a side view of the receptacle, the pawl assembly, and the plow bracket shown in FIGS. 18-24, taken from the perspective of FIGS. 22 and 24, immediately after first pawl has been released from the first docking lever, and with the plow bracket being withdrawn from the receptacle;

FIG. 26 is a side view of the receptacle, the pawl assembly, and the plow bracket shown in FIGS. 18-25, taken from the perspective of FIGS. 22, 24, and 25, after the first pawl has been released from the first docking lever, and with the plow bracket being withdrawn from the receptacle;

FIG. 27 is a side view of the receptacle, the pawl assembly, and the plow bracket shown in FIGS. 18-26, taken from the perspective of FIGS. 22 and 24-26, as the plow bracket is being inserted into (or backing out of) the receptacle, with the first docking lever shown in its locking position and the first pawl shown in its second position;

FIG. 28 is a side view of the receptacle, the pawl assembly, and the plow bracket shown in FIGS. 18-27, taken from the perspective of FIGS. 22 and 24-27, as the plow bracket is further inserted into the receptacle and the first docking lever is moving from its locking to its releasing position, with the first pawl shown in its second position;

DESCRIPTION OF PREFERRED EMBODIMENTS

FIGS. 1A-11, 15, and 16 depict a preferred embodiment of a device 10 (or individual components thereof) for securing a personal-transport vehicle, such as a power chair, wheelchair, scooter, etc., to a platform or other supporting surface. The platform can be part of a lift and carrier assembly 11 (see FIGS. 1A and 1B) installed on a motorized vehicle such as an automobile, van, pickup truck, etc. (hereinafter referred to as a "transporting vehicle"). The lift and carrier assembly 11 can raise and lower the platform between a lower position proximate the ground, and an upper position. The personal-transport vehicle can be loaded onto the lift and carrier assembly 11 while the platform is in the lower position. The personal-transport vehicle can be transported while the platform is in the upper position.

Figure 30A:
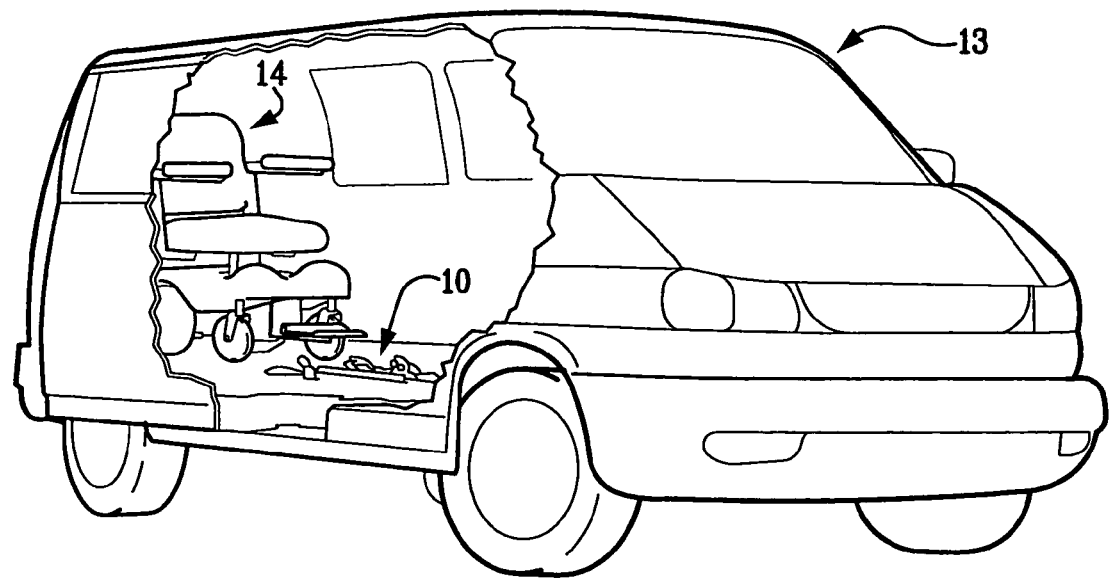
FIGS. 30A and 30B are perspective views of the device shown in FIGS. 1A-3B, with the receptacle of the device installed on the floorboard of a van, and the power chair shown in FIGS. 7 and 10 approaching the receptacle and mated with the receptacle, respectively.
Figure 30B:
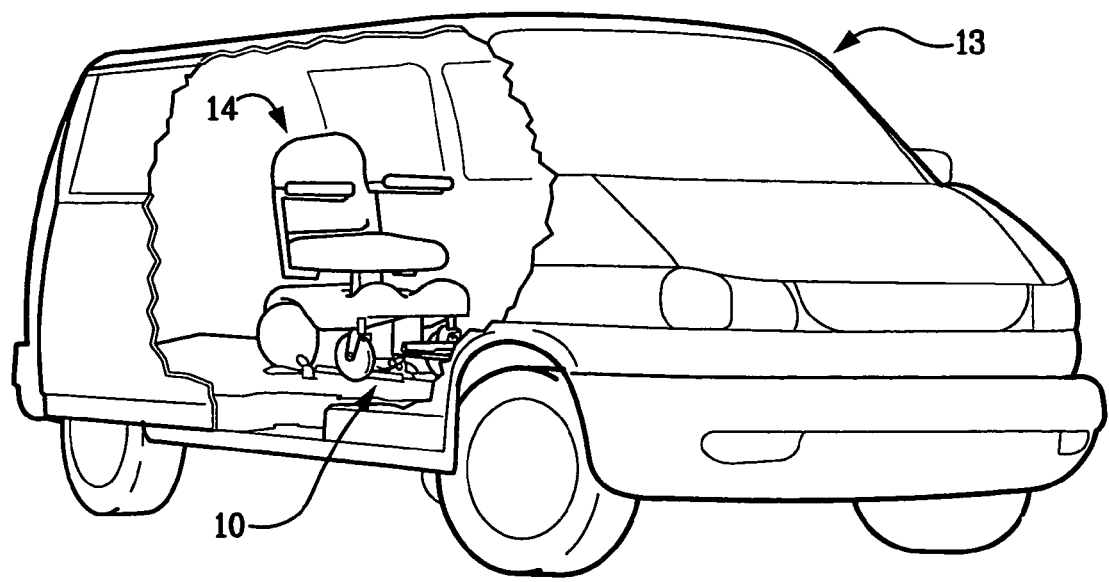

Alternatively, the device 10 can be mounted on a floorboard, bed, or other suitable surface of the transporting vehicle. For example, the device 10 can be mounted on a floorboard of a van, as depicted in FIGS. 30A and 30B, the bed of a pickup truck, or the bottom surface of a trunk of an automobile, and the personal-transport vehicle can be lifted using a conventional hoist-type lift.

The device 10 comprises a plow bracket 16, and a receptacle 18. The plow bracket 16 can be fixedly coupled to a personal-transport vehicle such as a power chair 14 (see FIGS. 7 and 10). The receptacle 18 can be fixedly coupled to a platform 20 of the lift and carrier assembly 11 (or other suitable mounting surface) (see FIGS. 1A and 1B). The receptacle 18 can securely receive the plow bracket 16 when the power chair 14 is driven onto the platform 20, as explained in detail below.

The receptacle 18 comprises a yoke bracket 28, a first (or master) docking lever 30, and a second (or slave) docking lever 32 (see, e.g., FIGS. 2A-2E, 3A, and 3B). The first and second docking levers 30, 32 are pivotally coupled to the yoke bracket 28, as discussed below. The receptacle 18 also comprises a first trigger 33, and a second trigger 34. The first and second triggers 33, 34 are pivotally coupled to the respective first and second docking levers 30, 32, and to the yoke bracket 28.

Figure 1B:
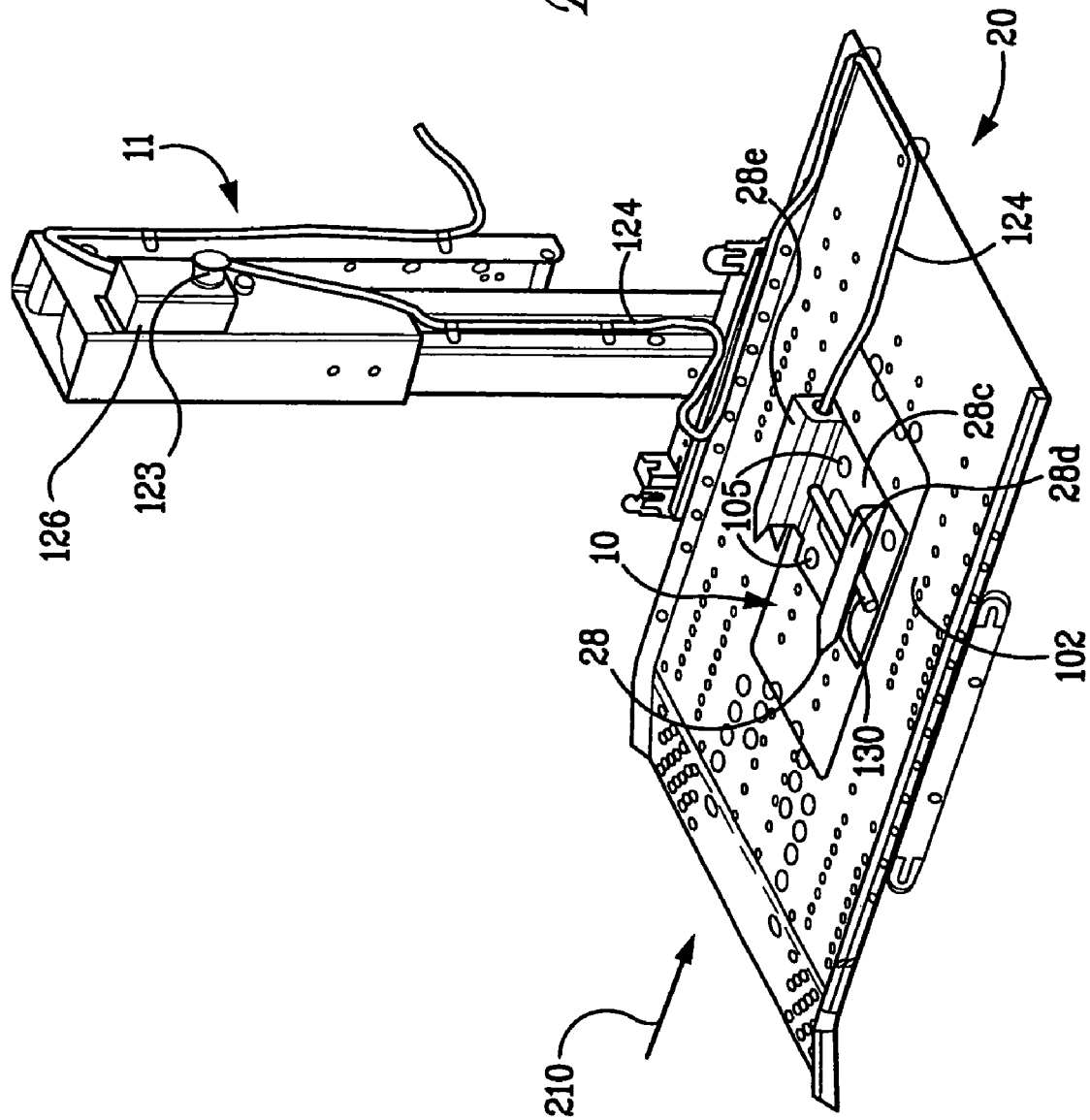
FIG. 1B is a perspective view of the device and lift and carrier assembly shown in FIG. 1A, with the wiring of the device routed externally to the lift and carrier assembly.

The yoke bracket 28 comprises a first and a second side panel 28a, 28b, and a bottom panel 28c (see, e.g., FIGS. 1A-1B). The side panels 28a, 28b adjoin opposing ends the bottom panel 28c, and are substantially perpendicular to the bottom panel 28c.

The yoke bracket 28 also comprises a first and a second wing member 28d, 28e. The first and second wing members 28d, 28e adjoin the respective first and second side panels 28a, 28b.

Figure 4:
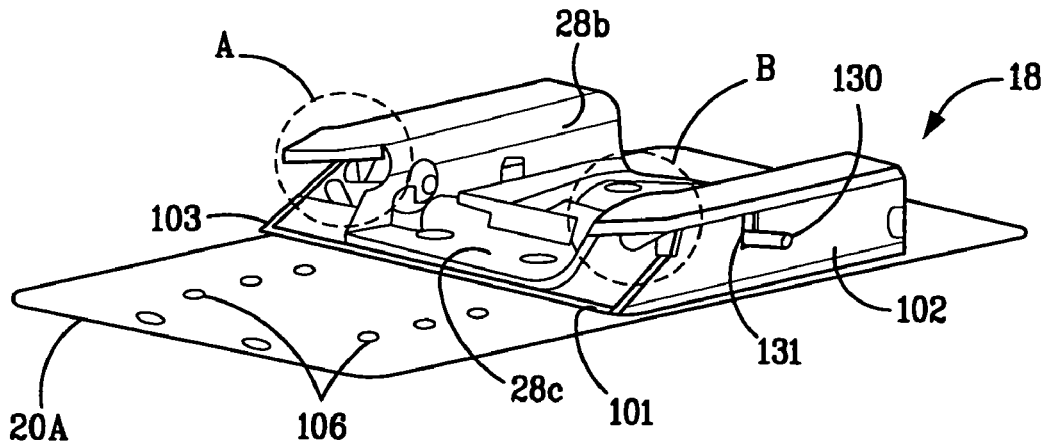
FIG. 4 is a perspective view of the receptacle and a mounting bracket of the device shown in FIGS. 1A-3B, mounted on a platform of the lift and carrier assembly shown in FIGS. 1A and 1B.
Figure 4A:
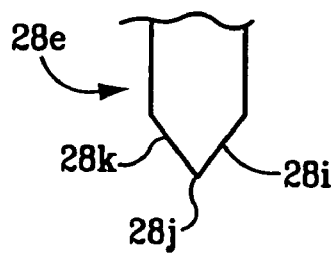
FIGS. 4A and 4B are magnified top views of the areas designated "A" and "B," respectively, in FIG. 4.
Figure 4B:
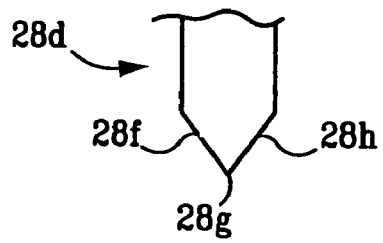
Figure 5:
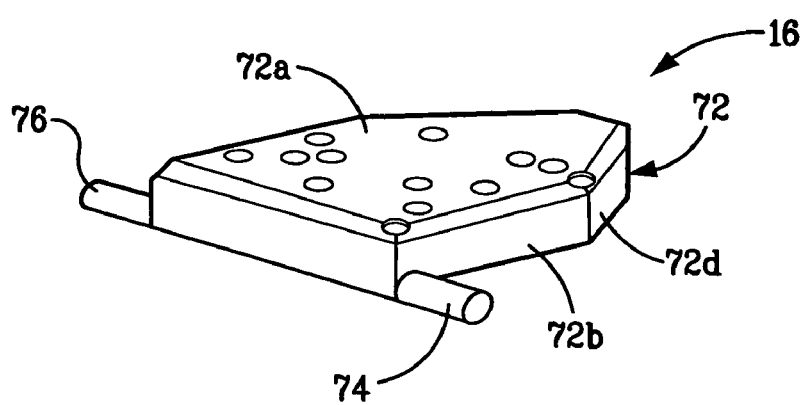
FIGS. 5 and 6 are perspective view of a plow bracket of the device shown in FIGS. 1A-4.

The first wing member 28d preferably has a substantially straight first edge portion 28f, and a curved second edge portion 28g that adjoins the first edge portion 28f (see FIG. 4B). The first wing member 28d also preferably includes a substantially straight third edge portion 28h that adjoins the second edge portion 28g.

The first, second, and third edge portions 28f, 28g, 28h define a forward end of the first wing member 28d. The first and third edge portions 28f, 28h are preferably oriented at an acute angle in relation to reach other. This feature gives the forward end of the first wing member 28 a substantially V-shaped profile, as shown in FIG. 4B.

The second wing member 28e preferably has a substantially straight first edge portion 28i, and a curved second edge portion 28j that adjoins the first edge portion 28i (see FIG. 4A). The second wing member 28e also preferably includes a substantially straight third edge portion 28k that adjoins the second edge portion 28j.

The first, second, and third edge portions 28i, 28j, 28k define a forward end of the second wing member 28e, and are substantially identical to the first, second, and third edge portions 28f, 28g, 28h of the first wing member 28a.

The first side panel 28a has a first edge portion 28l, and the second side panel 28b has a first edge portion 28m (see FIGS. 2A-2E, 3A, and 3B). The first edge portion 28l defines an open-ended slot 42. The first edge portion 28m defines an open-ended slot 43.

The first and second docking levers 30, 32 are pivotally coupled to the yoke arm 28, as previously noted. More particularly, the first docking lever 30 is pivotally coupled to the first side panel 28a by way of a threaded bolt 44. The bolt 44 is accommodated within through holes formed in each of the first side panel 28a and the docking lever 30, and is axially restrained by nuts 45 located on opposing sides of the docking lever 30. (Alternatively, the first docking lever 30 is pivotally coupled to the first side panel 28a by way of a shaft.)

The second docking lever 32 is pivotally coupled to the second side panel 28b by a second of the threaded bolts 44 (or shafts) (see FIGS. 3A and 3B). The second bolt 44 is accommodated within through holes formed in each of the second side panel 28b and the docking lever 32, and is axially restrained by a third and a fourth of the nuts 45, located on opposing sides of the docking lever 32.

Figure 2A:
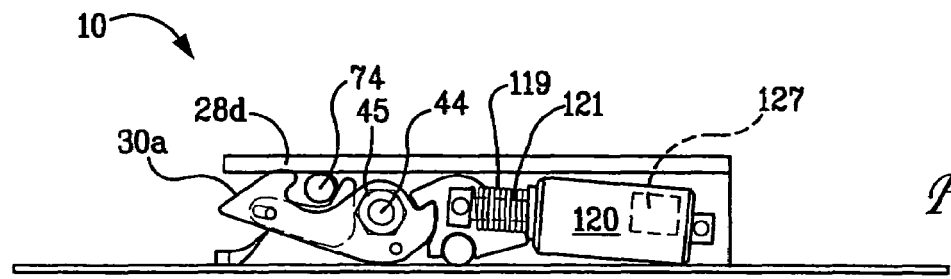
FIGS. 2A-2E are side views of the device shown in FIGS. 1A and 1B, as a plow bracket of the device is mated and unmated with a receptacle of the device (a first pawl, a shaft, and an electric solenoid of the device are not shown in FIG. 2E, for clarity)
Figure 2B:
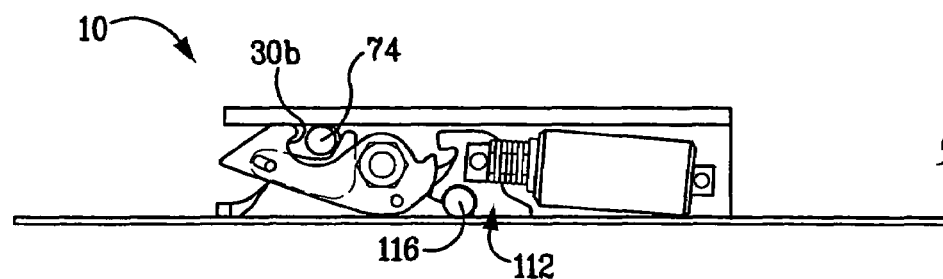
Figure 2C:
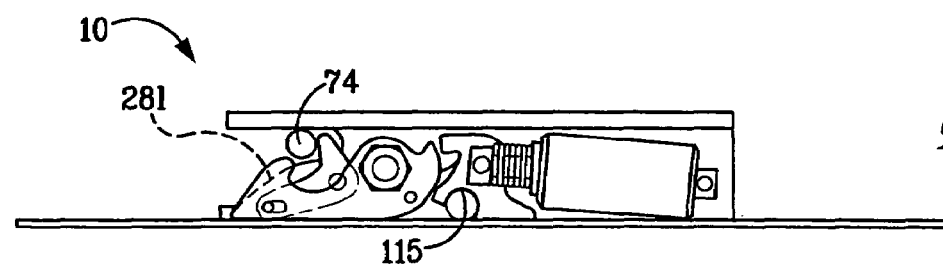
Figure 2D:
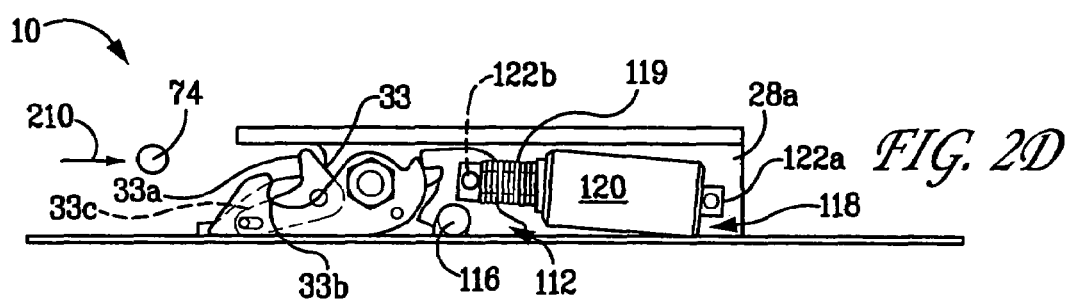
Figure 2E:
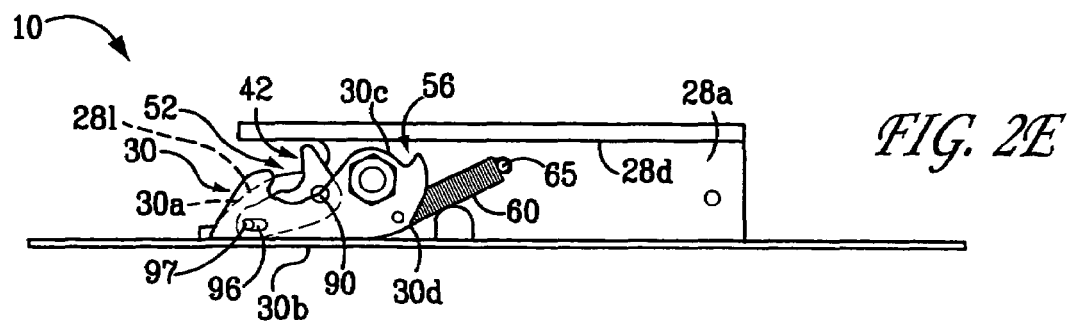

The first and second docking levers 30, 32 can pivot between a locking position (see, e.g., FIGS. 2A and 3A) and a releasing position (see, e.g., FIGS. 2E and 3B). The docking levers 30, 32 are pivotally biased in a counterclockwise direction (from the perspective of FIGS. 2A-2E) by respective springs 60, 62 (see, e.g., FIGS. 2E and 3A). In other words, the springs 60, 62 bias the docking levers 30, 32 toward the releasing position.

A first end of each of the springs 60, 62 is retained by an associated pin 65 that extends from the respective first and second side panels 28a, 28b (see FIGS. 2E and 3A). A second end of each of the springs 60, 62 is retained by the respective first and second docking levers 30, 32, and is accommodated in through holes formed therein. The optimal spring rate of the springs 60, 62 is application-dependent. A specific value for this parameter therefore is not presented herein.

The first docking lever 30 has a first edge portion 30a, and a second edge portion 30b that adjoins the first edge portion 30a (see FIGS. 2A-2E). The second edge portion 30b defines a first indentation 52 in the first docking lever 30. The first docking lever 32 has a first edge portion 32a, and a second edge portion 32b that adjoins the first edge portion 32a (see FIGS. 3A, 3B). The second edge portion 32b defines a first indentation 54 in the second docking lever 32.

The first docking lever 30 also has a third edge portion 30c (see FIGS. 2A-2E). The third edge portion 30c defines a second indentation 56 in the first docking lever 30. The first docking lever 30 also includes a fourth edge portion 30d that adjoins the third edge portion 30c.

The second docking lever 32 has a third edge portion 32c (see FIGS. 3A, 3B). The third edge portion 32c defines a second indentation 57 in the first docking lever 30. The second docking lever 32 also includes a fourth edge portion 32d that adjoins the third edge portion 32c.

The first docking lever 30 is restrained from clockwise rotation past its locking position (from the perspective of FIGS. 2A-2E) by the first wing member 28d. More particularly, the first wing member 28d is located above the docking lever 30, and intersects the plane of rotation of the docking lever 30. Clockwise rotation of the docking lever 30 causes a portion of the first edge portion 30a of the first docking lever 30 to contact the wing member 28d as the first docking lever 30 reaches the locking position (see, e.g., FIG. 2A). This contact interferes with further clockwise movement of the first docking lever 30, and thereby prevents the first docking lever 30 from pivoting past its locking position.

The second docking lever 32 is likewise restrained from counterclockwise rotation past is locking position (from the perspective of FIGS. 3A, 3B) by the second wing member 28e. More particularly, the second wing member 28e is likewise located above the second docking lever 32, and intersects the plane of rotation of the second docking lever 32. Counterclockwise rotation of the second docking lever 32 (from the perspective of FIGS. 3A, 3B) causes the first edge portion 32a of the second docking lever 32 to contact the second wing member 28e as the second docking lever 32 reaches the locking position (see FIG. 3A). This contact interferes with further counterclockwise movement of the second docking lever 32, and thereby prevents the second docking lever 32 from pivoting past its locking position.

Figure 15:
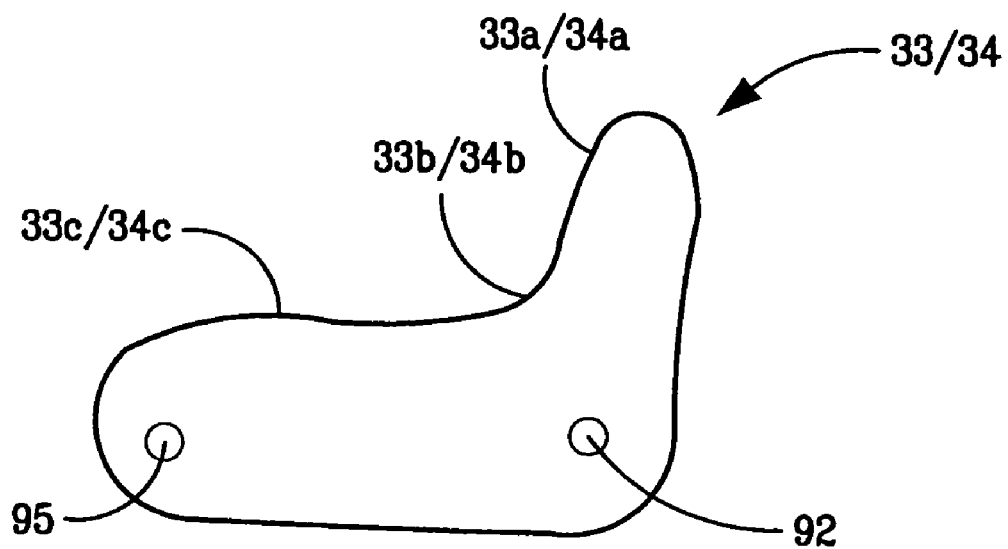
FIG. 15 is a side view of a trigger of the device shown in FIGS. 1A-3B.

The first trigger 33 is substantially "L" shaped (see, e.g., FIG. 15). The first trigger 33 has a substantially straight first edge portion 33a, and a curved second edge portion 33b that adjoins the first edge portion 33a. The first trigger 33 also has a substantially straight third edge portion 33c that adjoins the second edge portion 33b.

The first trigger 33 is pivotally coupled to the first side panel 28a of the yoke arm 28, as noted previously. In particular, a first pin 90 is fixedly coupled to, and extends outward from the first side panel 28a (see FIGS. 2A-2E). The first trigger 33 has a first through hole 92 formed proximate a first end thereof (see FIG. 15). The first trigger 33 is mounted on the first pin 90 by way of the first through hole 92. The first trigger 33 can be retained on the first pin 90 using a suitable means such as an E-clip, or a bolt that engages threads formed on an end of the pin 90.

The first trigger 33 is also pivotally coupled to the first docking lever 30. In particular, the first trigger 33 has a second through hole 95 formed proximate a second end thereof (see FIG. 15), and the first docking lever 30 has a slot 96 formed therein (see FIGS. 2A-2E). A second pin 97 extends through and between the slot 96 and the second through hole 95 so as to pivotally couple the first trigger 33 and the first docking lever 30. The second pin 97 can be retained in the slot 96 and the second through hole 95 by a suitable means such as E-clips, or bolts that engage threads formed on opposite ends of the pin 97.

The first trigger 33 pivots about the first pin 90, between a first position (FIG. 2A) and a second position (FIG. 2E) as the first docking lever 30 pivots between its locking and releasing positions. (The slot 96 in the first docking lever 30 permits the second pin 97 to translate linearly, as well as pivotally, in relation to the first docking lever 30, thereby facilitating the noted movement of the first trigger 33 and the first docking lever 30.)

The second trigger 34 is substantially identical to the first trigger 33, and includes first, second, and third edges 34a, 34b, 34c that are substantially identical to the respective first, second, and third edges 33a, 33b, 33c of the first trigger 33 (see FIG. 15). The second trigger 34 also includes first and second through holes 92, 95, and is pivotally coupled to the second docking lever 32 and the second side panel 28b of the yoke arm 28 second arm 28b via a first and second pin 90, 97 as described above in relation to the first trigger 33 (the second docking lever 32 also has one of the slots 96 formed therein to accommodate another of the second pins 97).

The second trigger 34 pivots between a first position (FIG. 3A) and a second position (FIG. 3B) as the second docking lever 32 pivots between its locking and releasing positions, in a manner substantially identical to the first trigger 33.

The device 10 also comprises a pawl assembly 110 (see FIGS. 2A-2E, 3A, 3B, 11, and 16). The pawl assembly 110 comprises a first (or master) pawl 112, a second (or slave) pawl 114, and a shaft 116. The device 10 also includes an electric solenoid 118 and a spring 119 for actuating the first and second pawls 112, 114. (The optimal value for the spring rate of the spring 119 is application-dependent. A particular value for this parameter therefore is not specified herein.)

The first and second side panels 28a, 28b each have a slot 115 formed therein for receiving the shaft 116. The first pawl 112 is fixedly coupled to a first end of the shaft 116, outward of the first side panel 28a. The second pawl 114 is fixedly coupled to a second end of the shaft 116, outward of the second side panel 28b. The first and second pawls 112, 114 each include a slot 117 for accommodating the shaft 116 (see FIG. 15).

The shaft 116 can rotate within the slots 115 formed in the first and second side panels 28a, 28b. This rotation permits the first and second pawls 114, 116 to each move between a first, or engaged position (FIGS. 2A and 3A), and a second, or disengaged position (FIGS. 2D and 3B).

The electric solenoid 118 includes a body 120 and a shaft 121. The shaft 121 extends into and out of the body 120 between a first, or retracted position (FIG. 2C) and a second, or extended position (FIG. 2A). The body 120 is fixedly coupled to the first side panel 28a of the yoke bracket 28 by a first bracket 122a. The shaft 121 is pivotally coupled to the first pawl 112 by a second bracket 122b.

Movement of the shaft 121 between its extended and retracted positions moves the first pawl 112 between its engaged and disengaged positions. (The first and second pawls 112, 114 are fixedly coupled to the shaft 116, as noted above. Movement of the first pawl 112 between its engaged and disengaged positions thus causes the second pawl 114 to move between its respective engaged and disengaged positions.)

The electric solenoid 118 can be actuated, for example, by a palmbutton switch 123 mounted at a suitable location on the lift and carrier assembly 11 (see FIGS. 1A and 1B). The electric solenoid 118 and palmbutton switch 123 can be electrically coupled by wiring 124. The wiring 124 can be routed internally, through the structure of the lift and carrier assembly 11 and under the platform 20, as shown in FIG. 1A. Alternatively, the wiring 124 can be routed externally to the lift and carrier assembly 11 and over the platform 20, as shown in FIG. 1B (routing the wiring 124 in this manner may be necessary in applications where the device 10 is installed after the lift and carrier assembly 11 has been assembled.)

Alternative embodiments of the device 10 can be equipped with a hand or foot-actuated switch mounted at a suitable location on the platform 20. The electric solenoid 118 can be activated using wireless means such as infrared or radio-frequency communications in other alternative embodiments.

Figure 16:
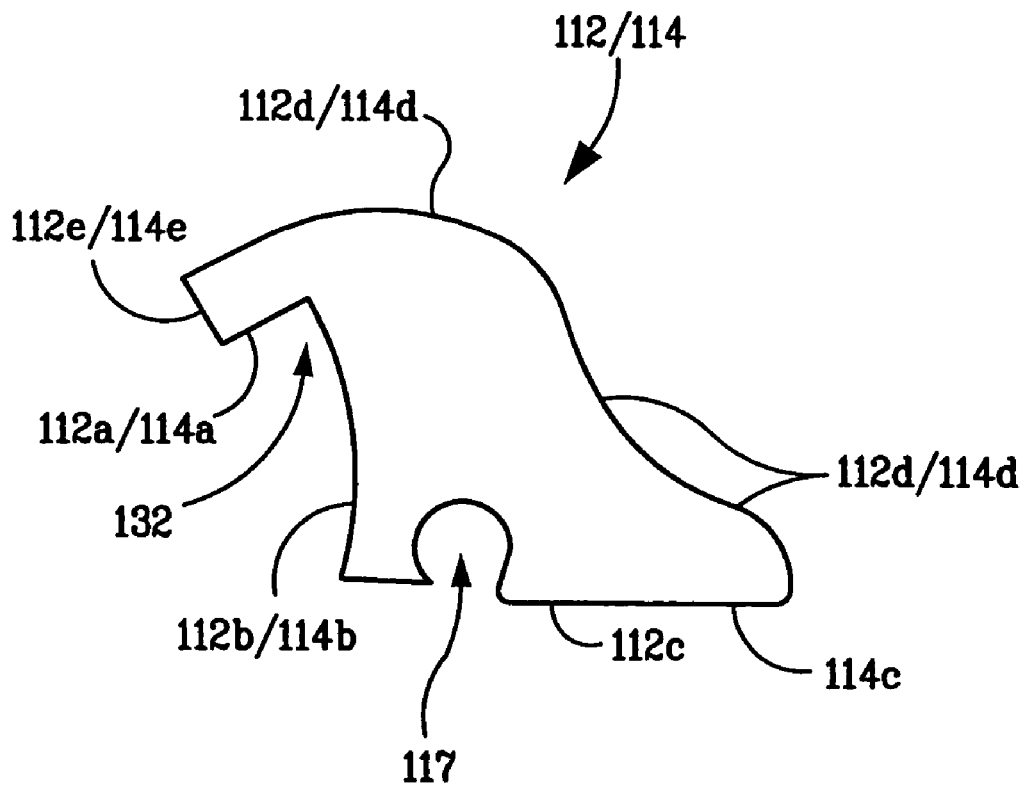
FIG. 16 is a side view of a pawl of the device shown in FIGS. 1A-3B.

The first pawl 112 includes a first edge portion 112a, and an adjoining second edge portion 112b (see FIG. 16). The shape of the second edge portion 112b substantially matches that of the fourth edge portion 30d of the first docking lever 30. The first and second edge portions 112a, 112b form an indentation 132 in the first pawl 112.

The first pawl 112 also includes a substantially straight third edge portion 112c, and a curved fourth edge portion 112*d* that adjoins the third edge portion 112*c*. The first pawl 112 further includes a fifth edge portion 112*e* that adjoins the fourth edge portion 112*d*.

The second pawl 114 is substantially identical to the first pawl 112. The second pawl 114 includes first, second, third, fourth, and fifth edge portions 114*a*, 114*b*, 114*c*, 114*d*, 114*e* that are substantially identical to the first, second, third, fourth, and fifth edge portions 112*a*, 112*b*, 112*c*, 112*d*, 12*e* of the first pawl 112.

The device 10 can further include a conventional limit switch 125, and an indicator light 126 (see FIGS. 1A, 1B, 3A, and 3B). The indicator light 126 can be mounted at a suitable location on the lift and carrier assembly 11, such as that shown in FIGS. 1A and 1B. The limit switch 125 can be fixedly coupled to the second side panel 28*a* of the yoke bracket 28 by way of a bracket 126. The limit switch 125 is positioned so that the fourth surface 114*d* of the second pawl 114 contacts and depresses an actuator 125*a* of the limit switch 125 when the second pawl 114 is in its engaged position (see FIG. 3A).

The limit switch 125 generates an output when the actuator 125*a* is depressed. The limit switch 125 is electrically coupled to the indicator light 126 so that the output of the limit switch 125 causes the indicator light 126 to illuminate. The indicator light 126 can thus provide the user with an indication that the second pawl 114 is in its engaged position.

The device 10 also comprises a mounting bracket 100 (see FIGS. 1A, 1B, and 4; the mounting bracket 100 is not shown in FIGS. 2A-2E, 3A, and 3B, for clarity). The mounting bracket 100 has a bottom panel 101, and first and second side panels 102, 103 that extend upward from opposing sides of the bottom panel 101. The bottom panel 101 is fixedly coupled to the bottom panel 28*c* of the yoke arm 28 by a suitable means such as fasteners, rivets, etc.

The mounting bracket 100 and the yoke arm 28 can be secured to a mounting plate 20*a* of the platform 20, as shown in FIGS. 1A, 1B, and 4). In particular, a plurality of through holes 105 are formed in the bottom panel 28*c* of the yoke arm 28 and the bottom panel 101 of the mounting bracket 100.

The mounting plate 20*a* has a plurality of through holes 106 formed therein. The through holes 106 can be formed along a substantial entirety of the length of the mounting plate 20*a*. The mounting bracket 101 and the yoke arm 28 can be positioned at a desired position on the mounting plate 20*a*, and the through holes 105 can be aligned with a corresponding set of the through holes 106. Conventional fasteners can be inserted through the through holes 105, 106 to secure the mounting bracket 101 and the yoke arm 28 to the mounting plate 20*a*.

Forming the through holes 106 along the length of the mounting plate 20*a* permits the yoke bracket 28 to be mounted at various positions on the platform 20 to accommodate a particular type of personal-transport vehicle, such as the power chair 14. Moreover, the height of the yoke bracket 28 in relation to the platform 20 can be adjusted by placing spacers between the bottom panel 101 of the mounting bracket 100 and the bottom panel 28*c* of the yoke bracket 28. These features can allow the device 10 to be used in conjunction with personal-transport vehicles of various types and sizes.

It should be noted that none of the various components of the receptacle 18 extend below the platform 20 (or other mounting surface). This feature can facilitate mounting the device 10 on surfaces such as the floorboard of a transporting vehicle.

The device 10 has been depicted as being mounted on the platform 20 for exemplary purposes only. The device 10 can be mounted on surfaces such as the bottom surface of a trunk of a passenger car, the floorboard inside a van or mini-van, the bed of a pickup truck, etc. The device 10 can be also be mounted on the floorboard of a motor vehicle, proximate the driver's position, so that a personal transport vehicle can be secured in a position that permits the occupant thereof to operate the motor vehicle.

The first side panel 102 of the mounting bracket 100 covers the first docking arm 30, first trigger 33, first pawl 112, and electric solenoid 118 when the yoke arm 28 is mounted on the mounting bracket 100. The second side panel 103 likewise covers the second docking arm 32, second trigger 34, second pawl 114, and limit switch 125 when the yoke arm 28 is mounted on the mounting bracket 100. The first and second side panels 102, 103 can thus protect the noted components from impact-related (and other types of) damage.

The plow bracket 16 can be fixedly coupled to the power chair 14 (or other personal-transport vehicle), as discussed above (see FIGS. 7, 8, and 10). The plow bracket 16 comprises a trunnion bracket 72 and a first and second trunnion 74, 76 (see FIGS. 5, 6, and 8). The trunnion bracket 72 comprises a substantially flat mounting portion 72*a*, a first lip 72*b* that extends downwardly from the mounting portion 72*a*, and a second lip 72*c* that extends downwardly from an opposing side of the mounting portion 72*a*. The trunnion bracket 72 preferably has a width that permits the trunnion bracket 72 to fit within the yoke arm 28 with minimal clearance between the first lip 72*b* and the first side panel 28*a*, and between the second lip 72*c* and the second side panel 28*b*.

Figure 6:
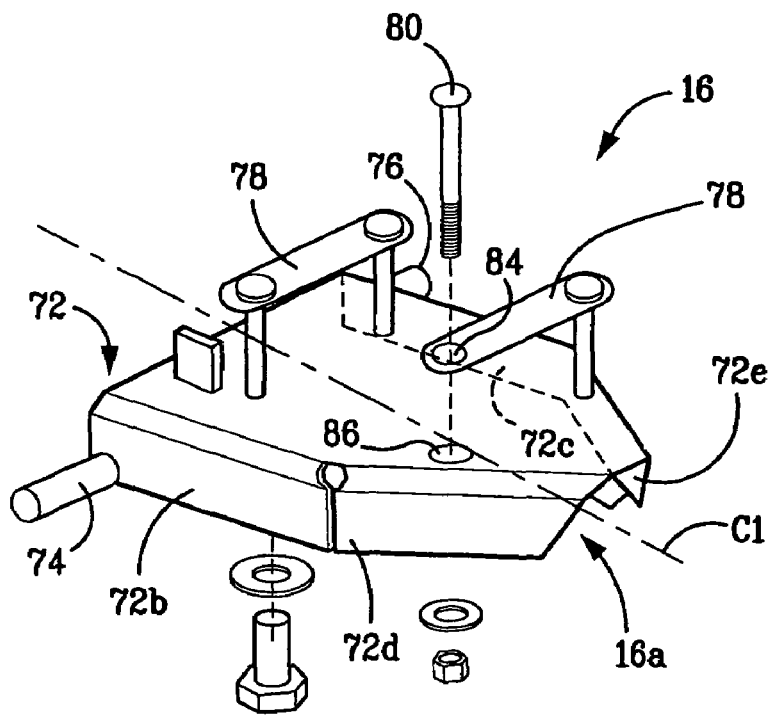
Figure 7:
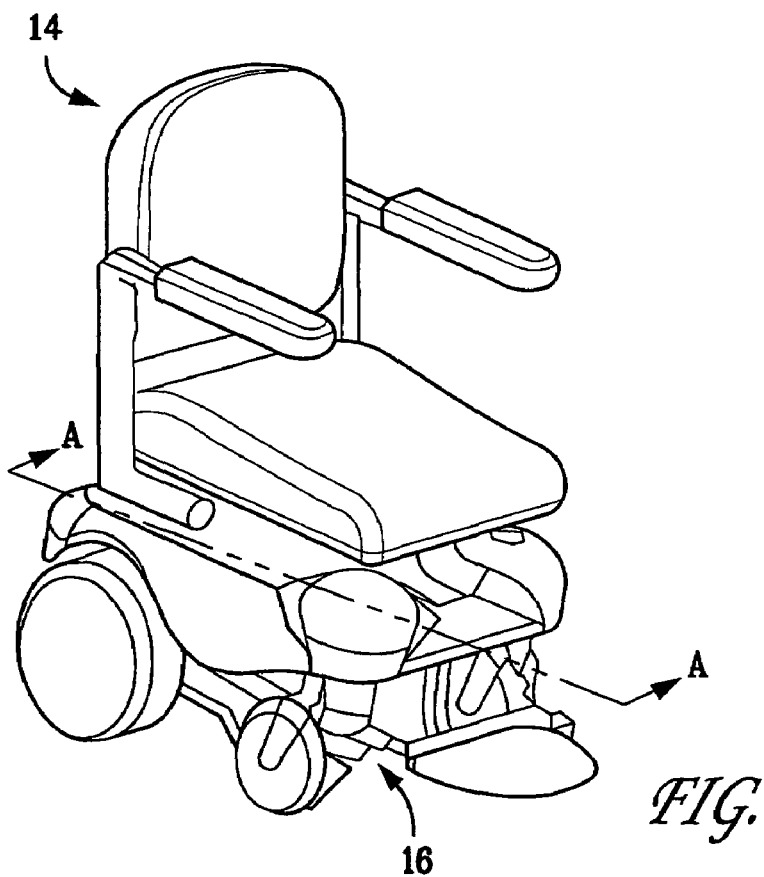
FIG. 7 is a perspective view of a power chair having the plow bracket shown in FIGS. 5 and 6 installed thereon.
Figure 8:
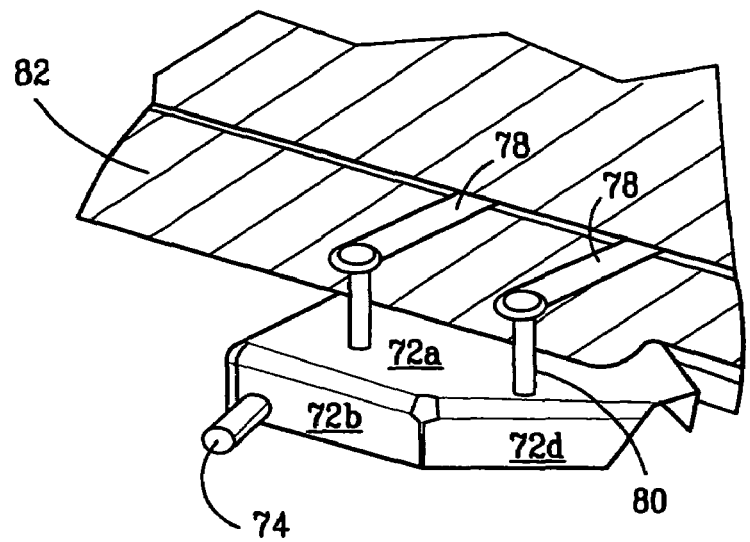
FIG. 8 is a cross-sectional perspective view of the power chair shown in FIG. 7 and the plow bracket shown in FIGS. 5-7.

The first trunnion 74 is fixedly coupled to the lip 72*b*, and extends from the lip 72*b* as shown in FIG. 6. The second trunnion 76 is fixedly coupled to the lip 72*c*, and extends from the lip 72*c*.

The plow bracket 16 also comprises a third and a fourth lip 72*d*, 72*e* that each extend downwardly from the mounting portion 76*a*, forward of the first and second lips 72*a*, 72*b*. The lips 76*d*, 76*e* are angled with respect to a centerline C1 of the plow bracket 16 so that the width of the plow bracket 16 reaches a minimum at a forward edge 16*a* of the plow bracket 16. The significance of this feature is explained below.

The plow bracket 16 can secured to the power chair 14 in any suitable manner. For example, the plow bracket 16 can be secured to the power chair 14 by brackets 78 (see FIGS. 6 and 8). More particularly, the mounting portion 72*a* can be positioned against a bottom surface of a beam 82 or other structural member that is located on the underside of the power chair 14. The brackets 78 can be positioned above the beam 82 so that each bracket 78 straddles the beam 82. The brackets 78 can be secured to the mounting portion 72*a* by elongated bolts 80. The bolts 80 are accommodated by through holes 84 formed in opposing ends of each bracket 78, and by through holes 86 formed in the mounting portion 72*a*. The beam 82 is thus clamped between the brackets 78 and the mounting portion 72*a*, thereby securing the plow bracket 16 to the power chair 14.

Figure 9:
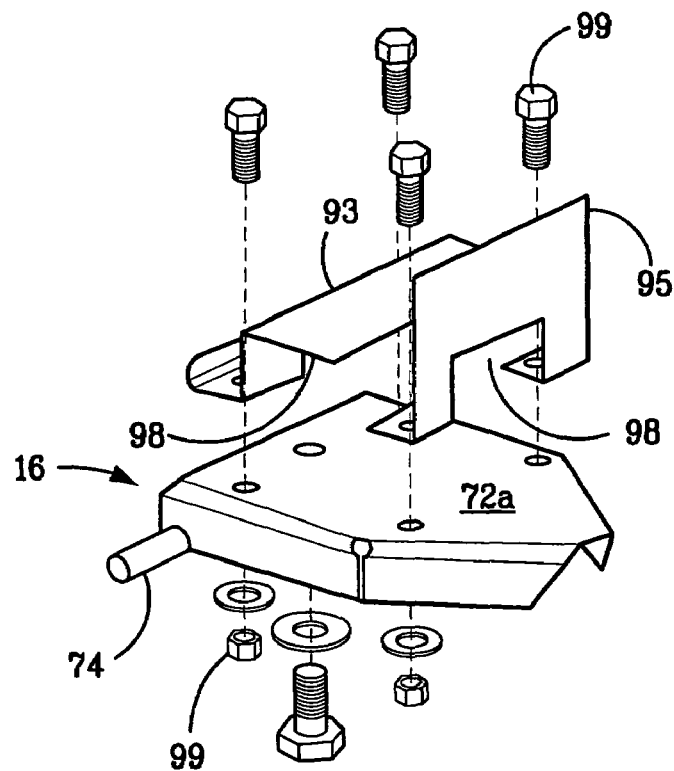
FIG. 9 is a partially exploded view of an alternative embodiment of the plow bracket shown in FIGS. 5-7.
Figure 10:
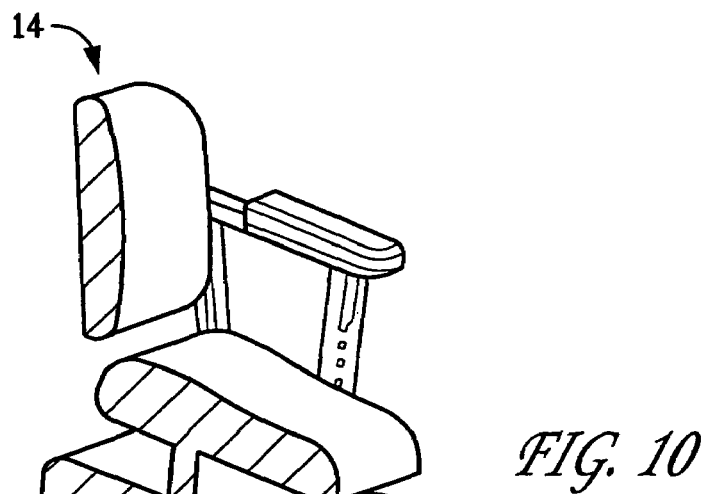
FIG. 10 is a perspective view of the power chair shown in FIG. 7 and the plow bracket shown in FIGS. 5-7, taken through the line "A-A" of FIG. 7.
Figure 11:
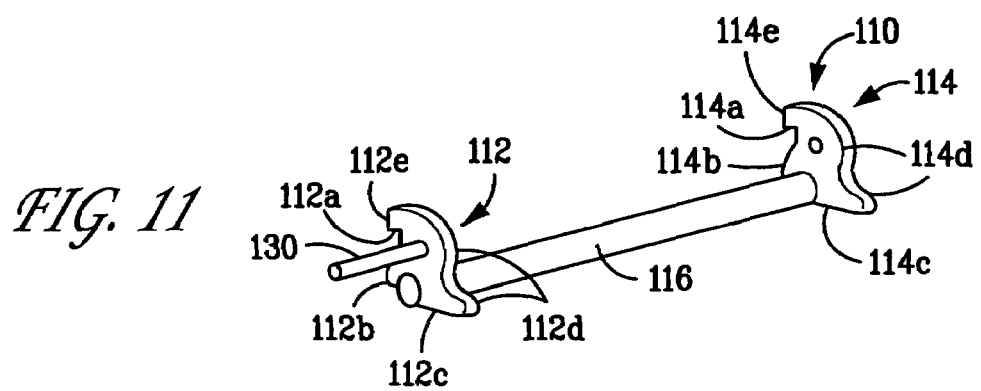
FIG. 11 is a is a perspective view of a pawl assembly of the device shown in FIGS. 1A-4.

Alternatively, the plow bracket 16 can be secured to the power chair 14 as follows using a first and a second bracket 95, 93 (see FIG. 9). The mounting portion 72*a* of the plow bracket 16 is positioned against the bottom surface of a beam 82. The brackets 95, 93 are subsequently placed over the beam 82 so that the brackets 95, 93 straddle the beam 82, and the beam 82 passes through a rectangular opening 98 defined in each of the brackets 95, 93. The brackets 95, 93 are then secured to the mounting portion 72*a* using fasteners 99, thereby securing the plow bracket 16 to the power chair 14. Other alternative mounting configurations for the plow bracket 16 are possible, depending on the configuration of the particular personal-transport vehicle with which the device 10 is used.

It should be noted that particular mounting configurations for the plow bracket 16 has been described for exemplary purposes only. Other mounting configurations can be used in the alternative.

Figure 12:
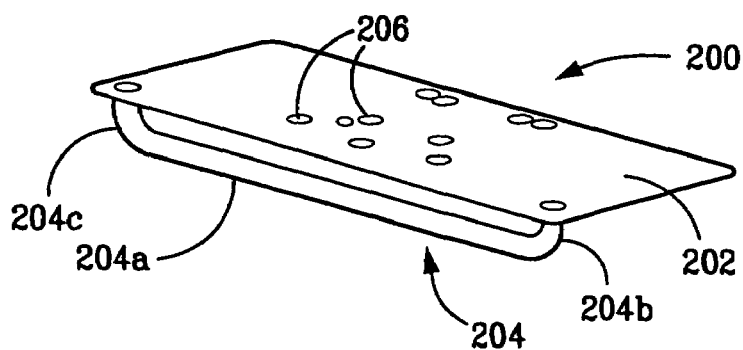
FIG. 12 is another alternative embodiment of the plow bracket shown in FIGS. 5-7 and 10.

FIG. 12 depicts an alternative embodiment of the plow bracket 16. In, particular, FIG. 12 depicts a bracket member 200 comprising a plate 202, and a substantially U-shaped bar 204. The bar 204 has a substantially horizontal first portion 204a, and second and third portions 204b, 204c that adjoin opposite ends of the first portion 204a. The second and third portions 204b, 204c are secured to the plate 202 by a suitable means such as conventional fasteners. The bracket member 200 can be secured to a bottom surface of the power chair 14 by conventional fasteners inserted in through holes 206 formed in the plate 202.

The device 10 secures the power chair 14 to the platform 20 through engagement of the receptacle 18 and the plow bracket 16 (or the bracket member 200). More specifically, the receptacle 18 is positioned on the platform 20 so that the yoke arm 28 and the docking levers 30, 32 can securely engage the first and second trunnions 74, 76 (or the bar 204 of the bracket member 200) when the power chair 14 is driven fully onto the platform 20. Details relating to these features are as follows.

The first and second docking levers 30, 32 are each biased toward their respective releasing positions, as noted previously. The power chair 14 can be driven onto the platform 20 in a direction denoted by the arrow 210 shown in FIGS. 1A, 1B, 2D, and 3B (this direction is hereinafter referred to as the "forward" direction, and the opposing direction is referred to as the "rearward" direction).

The first and second docking levers 30, 32, the first and second triggers 33, 34, and the first and second pawls 112, 113 are in the respective positions depicted in FIGS. 2D and 3B when the device 10 is not engaging the plow bracket 16. In particular, the first and second docking levers 30, 32 are in their respective releasing positions, and the first and second triggers 33, 34 are in their respective second positions under this condition.

The solenoid 18 is preferably de-energized at the start of the docking process. The bias of the spring 119 urges the fifth edge portion 112e of the first pawl 112 against the fourth edge portion 30d of the first docking lever 30 under this condition (see FIG. 2D). The fifth edge portion 114e of the first pawl 114 is likewise urged against the fourth edge portion 32d of the second docking lever 32 in response to the bias of the spring 119 (see FIG. 3B) (the first and second pawls 112, 114 are therefore positioned proximate their respective disengaged positions the start of the docking process).

The plow bracket 16 is preferably positioned on the power chair 14 so that the first trunnion 74 substantially aligns with the first edge portion 33a of the first trigger 33, and the second trunnion 76 substantially aligns with the first edge portion 34a of the second trigger 34 as the plow bracket 16 approaches the receptacle 18 (see FIGS. 2D and 3B). (Interference between the third and fourth lips 72d, 72e of the plow bracket 16 and the respective first edge portion 28f of the first wing member 28d and first edge portion 28i of the second wing member 28e can help to align the plow bracket 16 and the receptacle 18 as the plow bracket 16 is mated with the receptacle 18. The angled orientation of the third and fourth lips 72d, 72e and the first edges portions 28f, 28i can further help to align the plow bracket 16 and the receptacle 18.)

Continued movement of the power chair 14 (and the plow bracket 16) in the forward direction causes the first trunnion 74 to contact the first edge portion 33a of the first trigger 33, and the second trunnion 76 to contact the first edge portion 34a of the second trigger 34 (see FIGS. 2C and 3B). Movement of the power chair 14 in the forward direction also causes the first and second trunnions 74, 76 to enter the respective slots 42, 43 in the respective first and second side panels 28a, 28b of the yoke bracket 28.

The noted contact between the first trunnion 74 and the first trigger 33 causes the first trigger 33 to rotate clockwise (from the perspective of FIGS. 2A-2E), toward its first position, as the power chair 14 continues to move in the forward direction. Contact between the second trunnion 76 and the second trigger 34 likewise causes the second trigger 34 to rotate counterclockwise (from the perspective of FIGS. 3A and 3B), toward its first position.

Movement of the first trigger 33 toward its first position exerts a torque on the first docking lever 30 by way of the second pin 97. This torque causes the first docking lever 30 to rotate in a clockwise direction (from the perspective of FIGS. 2A-2E), toward its locking position. Movement of the second trigger 34 toward its first position likewise exerts a torque on the second docking lever 32 that causes the second docking lever 32 to rotate toward its locking position.

The first and second trunnions 74, 76 become disposed within the respective indentations 52, 54 formed in the first and second docking levers 30, 32 as the first and second docking levers 30, 32 approach and reach their locking positions. Interference between the first and second trunnions 74, 76 and the respective edges 30b, 32b of the first and second docking levers 30, 32 prevents the trunnions 74, 76 from backing out of the respective slots 42, 43 in the yoke bracket 28. The noted interference thus prevents the plow bracket 16 from backing out of the receptacle 18, thereby securing the power chair 14 in position on the platform 20.

The bias of the spring 119 causes the first pawl 112 to rotate in a counterclockwise direction (from the perspective of FIG. 2A-2E), into its engaged position, as the first docking lever 30 reaches is locking position. (Rotation of the first docking lever 30 to its locking position eliminates the previously-noted interference between the fifth edge portion 112e of the first pawl 112 and the fourth edge portion 30d of the first docking lever 30, thereby facilitating clockwise rotation of the first pawl 112.)

The bias of the spring 119 likewise causes the second pawl 114 to rotate in a clockwise direction (from the perspective of FIGS. 3A and 3B), into its engaged position, as the second docking lever 30 reaches its locking position.

Rotation of the first pawl 112 to its engaged position causes the portion of the first pawl 112 defined by the first and fifth edge portions 112a, 112e to become disposed in the indentation 132 of the first docking lever 30. Moreover, the portion of the first docking lever 30 defined by the third and fourth edge portions 30c, 30d becomes disposed in the indention 56 of the first docking lever 30. The resulting interference between the first edge portion 112a of the first pawl 112 and the third edge portion 30c of the first docking lever 30 helps to secured to the first docking lever 30 in its locking position.

The indicator light 126 illuminates when the first and second pawls 112, 114 are in their respective engaged positions, as discussed above. The indicator light 126 can thus provide an indication that the first and second docking levers 30, 32 are secured in their respective locking positions. Moreover, coupling the first and second pawls 112, 114 by way of the shaft 116 prevents either of the first and second pawls 112, 114 from reaching its engaged position when the other of the first and second pawls 112, 114 does not simultaneously reach its respective engaged position. This feature can thus prevent incomplete locking of the first and second locking levers 30, 32. (Coupling the first and second pawls 112, 114 by way of the shaft 116 can also eliminate the need for a second of the solenoids 18 to actuate the first and second pawls 112, 114.)

The plow bracket 18 (and the power chair 14) can be released from the receptacle 18 as follows. The release process is initiated by activating the electric solenoid 118 via the palmbutton switch 123. Activation of the electric solenoid 118 causes the shaft 121 to be retracted into the body 120, against the bias of the spring 119.

Retraction of the shaft 121 imparts a torque to the first pawl 112 that causes the first pawl 112 to rotate in a clockwise direction (from the perspective of FIGS. 2A-2E), into its releasing position. (The torque exerted on the first pawl 112 is transmitted to the second pawl 114 by way of the shaft 116, and causes the second pawl 114 to simultaneously translate to its releasing position.)

The first and second trunnions 74, 76 remain in place within the slots 42, 43 of the respective first and second side panels 28a, 28b until the power chair 14 is moved in the rearward direction by the user. Moreover, the first and second triggers 33, 34 remain at or near their respective first positions due to contact with the respective first and second trunnions 74, 76 and the inertia of the power chair.

Movement of the power chair 14 in the rearward direction causes the first and second trunnions 74, 76 to back away from the respective first and second triggers 33, 34. The bias of the spring 60 causes the first docking lever 30 rotate in a counterclockwise direction (from the perspective of FIGS. 2A-2E), toward its releasing position, as the first trunnion 74 backs away from the first trigger 33. The first docking lever 30 drives the first trigger 33 in a counterclockwise direction, toward its second position, by way of the associated second pin 97.

The bias of the spring 62 likewise causes the first docking lever 30 to rotate toward its releasing position as the second first trunnion 76 backs away from the second trigger 34. The first docking lever 30 drives the first trigger 33 in a counterclockwise direction, toward its second position, by way of the associated second pin 97.

Further movement of the power chair 14 in the rearward direction eventually permits the first and second docking levers 30, 32 to reach their respective releasing positions, thereby allowing the first and second trunnions 74, 76 to completely back out of the respective slots 42, 43 (and permitting the power chair 14 to be driven off the platform 20.

The electric solenoid 118 preferably includes a timer 127 that deactivates the electric solenoid 118 after a predetermined operation, e.g., five to ten seconds (see FIG. 2A). Deactivation of the electric solenoid 118 permits the first and second pawls 112, 14 to return to the positions depicted respectively in FIGS. 2D and 3B after the power chair 14 has backed away from the receptacle 18. Alternatively, the first and second pawls 112, 113 can return to their engaged positions to secure the first and second docking levers 30, 32 in their respective locking positions if the power chair 14 has not backed away from the receptacle within the predetermined period.

The first pawl 112 can have a pin 130 secured thereto for manually actuating the first and second pawls 112, 114 between their respective engaged and disengaged positions (the pin 130 is shown only in FIGS. 1A, 1B, 4, and 11, for clarity). The pin 130 extends through a slot 131 formed the first side panel 102 of the mounting bracket 100. The pin 130 can be used to release the first and second docking levers 30, 32 from the respective first and second pawls 112, 114, for example, when electrical power to the electric solenoid 118 is not available, or when the electric solenoid 118 is otherwise non-functional.

Operation of the device 10 with the bracket member 200 is substantially similar to operation of the device 10 with the plow bracket 16. In particular, the first portion 204a of the bar 204 can contact and actuate the first and second triggers 33, 34 as the bracket member 200 is mated with the receptacle 18, in the manner described above in relation to the first and second trunnions 74, 76.

Moreover, interference between the second and third portions 204b, 204c of the bar 204 and the respective first edge portion 28f of the first wing member 28d and first edge portion 28i of the second wing member 28e can help to align the bracket member 200 and the receptacle 18 as the bracket member 200 is mated with the receptacle 18.

The power chair 14 (or other personal-transport vehicle) can thus be released from the platform 20 no action on the part of the user other than depressing the palmbutton switch 123 and driving (or otherwise moving) the power chair 14 off of the platform 20. Moreover, the receptacle 18 automatically returns to a configuration in which the receptacle 18 is ready to again receive the plow bracket 16.

The power chair 10 (or other type of personal-transport vehicle) can be maneuvered to engage the plow bracket 16 and the receptacle 18 by techniques other than driving the power chair. For example, the device 10 can be mounted on a floorboard of a van, and the power chair 14 can be lifted into the van using a conventional hoist-type lift, as discussed above. The power chair 14 can be maneuvered to engage the plow bracket 16 and the receptacle 18 by the lifting device in this type of mounting arrangement.

The engagement of the plow bracket 16 and the receptacle 18 can restrain the power chair 14 from rotational movement about an axis passing vertically through the platform 20, and about an axis passing through a centerline of the platform 20. The ability of the device 10 to restrain the power chair 14 from rotational movement represents a substantial advantage in relation to conventional power-chair restraints that inhibit linear motion only. For example, the added degree of restraint provided by the power chair 14 inhibits the power chair 18 from swiveling about the vertical axis as the transporting vehicle turns at relatively high speed, brakes suddenly, or bounces in response to rough road conditions. This added stability substantially reduces the potential for the power chair 14 to separate from the platform 20 as it is being transported.

Moreover, the device 10 can be adapted to various types of personal-transport vehicles. In particular, the device 10 can interface with a personal transport vehicle by way of a structural member located on the underside of the vehicle, e.g., the beam 82 of the power chair 14. Most personal-transport vehicles comprise a structural member suitable for this purpose. Moreover, the positions of the receptacle 18 and the plow bracket 16 can be adjusted in to accommodate personal-transport vehicles of difference sizes and configurations. Hence, the device 10 can be used in conjunction with personal-transport vehicles that range widely in size and general overall configuration.

The positions of the receptacle 18 and the plow bracket 16 can be adjusted without removing or otherwise altering the relationship between the first and second docking levers 30, 32 and the yoke arm 28. In other words, the locking geometry of the device 10 remains constant regardless of the particular application in which the device 10 is used. Hence, a timeconsuming readjustment of the locking geometry is not required each time the device 10 is used with a different type of personal-transport vehicle.

Devices that rely on a hold-down arm or similar mechanism, by contrast, are restricted to use with personal-transport vehicles having a suitable rigid surface within the range of motion of the hold-down arm. Certain types of personal-transport vehicles currently in widespread use, e.g., power chairs, are not commonly equipped with such a surface. Hence, the device 10 can be configured for use with a substantially greater variety of personal-transport vehicles than devices comprising a hold-down arm.

Moreover, the device is self-centering. In particular, the trunnions 74, 76 tend to straighten the power chair 14 with respect to the centerline of the platform 20 when the trunnions 74, 76 are driven forward into the slots 44, 46. Moreover, the trunnions 74, 76 and the first and second docking levers 30, 32 remain visible after the power chair 14 has been placed in its stored position on the platform 20. Hence, the latching mechanism 10 can provide a positive visual indication that the power chair 14 has been secured to the platform 20.

It is to be understood that even though numerous characteristics of the present invention have been set forth in the foregoing description, together with details of the structure and function of the invention, the disclosure is illustrative only, and changes may be made in detail, especially in matters of shape, size, and arrangement of the parts, within the principles of the invention to the full extent indicated by the broad general meaning of the terms in which the appended claims are expressed. For example, substantial variations can be made to the trunnion bracket 72 or the bracket member 200 to tailor the trunnion bracket 72 of the bracket member 200 to the configuration of a particular personal-transport vehicle with which the device 10 is used.

The orientations of the plow bracket 16 and the receptacle 18 in relation to the respective power chair 14 (or other personal-transport vehicle) and platform 20 (or other suitable mounting surface) can be reversed with respect to the orientations described above, to allow the plow bracket 16 to mate with the receptacle 18 when the power chair 14 is backed onto the platform 20.

Alternative embodiments of the plow bracket 16 can be mounted on the platform 20 (or other suitable mounting surface), and alternative embodiments of the receptacle 18 can be mounted on the power chair 14 (or other personal-transport vehicle). Moreover, alternative embodiments of the plow bracket 16 and the receptacle 18 can be mounted on the power chair 14 (or other personal-transport vehicle) and the platform 20 (or other suitable mounting surface) in a vertical orientation, i.e., in orientations rotated ninety degrees in relation to the above-disclosed orientations. With this arrangement, the power chair 14 can be positioned over the receptacle, and lowered so that the plow bracket engages the receptacle due to the downward movement of the plow bracket 16 in relation to the receptacle.

FIGS. 13A-14C depict an alternative embodiment of the device 10 in the form of a device 520. The device 520 is substantially identical to the device 10, with the exception that the first and second pawls 112, 114 are actuated by a manually-actuated cable mechanism 522 in lieu of the electric solenoid 118 (see FIGS. 13A and 13B). The cable mechanism 522 can be actuated by a suitable palm-actuated or foot-actuated lever.

The device 520 can be equipped with a toggle 524 to retain the first and second pawls 112, 114 in their respective disengaged positions until the plow bracket 16 is mated with the receptacle 18 (see FIGS. 14A-14C). In particular, the toggle 524 can be rotatably mounted on the threaded bolt 44 associated with the second side panel 28b. The toggle 524 has a slot 525 formed therein. A pin 526 mounted on the second docking lever 32 extends into the slot 525.

The toggle 524 rotates, due to its own weight, from the position depicted in FIG. 14A to the position depicted in FIG. 14B as the pawl 114 is moved from its engaged to its disengaged position. (Further counterclockwise movement of the toggle 524 past the position depicted in FIG. 14B is prevented by contact between the pin 526 and an end of the slot 524.) Contact between an edge 524a of the toggle 524 and a pin 528 mounted on the second pawl 114 causes the second pawl 114 (and the attached first pawl 112) to remain at or near their respective disengaged positions if pressure on the cable-actuator lever is released.

Movement of the second docking lever 32 to is releasing position causes the pin 525 to drive the toggle 524 in a clockwise direction (from the perspective of FIGS. 14A-14C), to the position depicted in FIG. 14C, thereby moving the edge 524a of the toggle 524 off of the pin 528. Hence, the second pawl 114 can subsequently move to its engaged position when the second docking lever 32 returns to its locking position.

Figure 17:
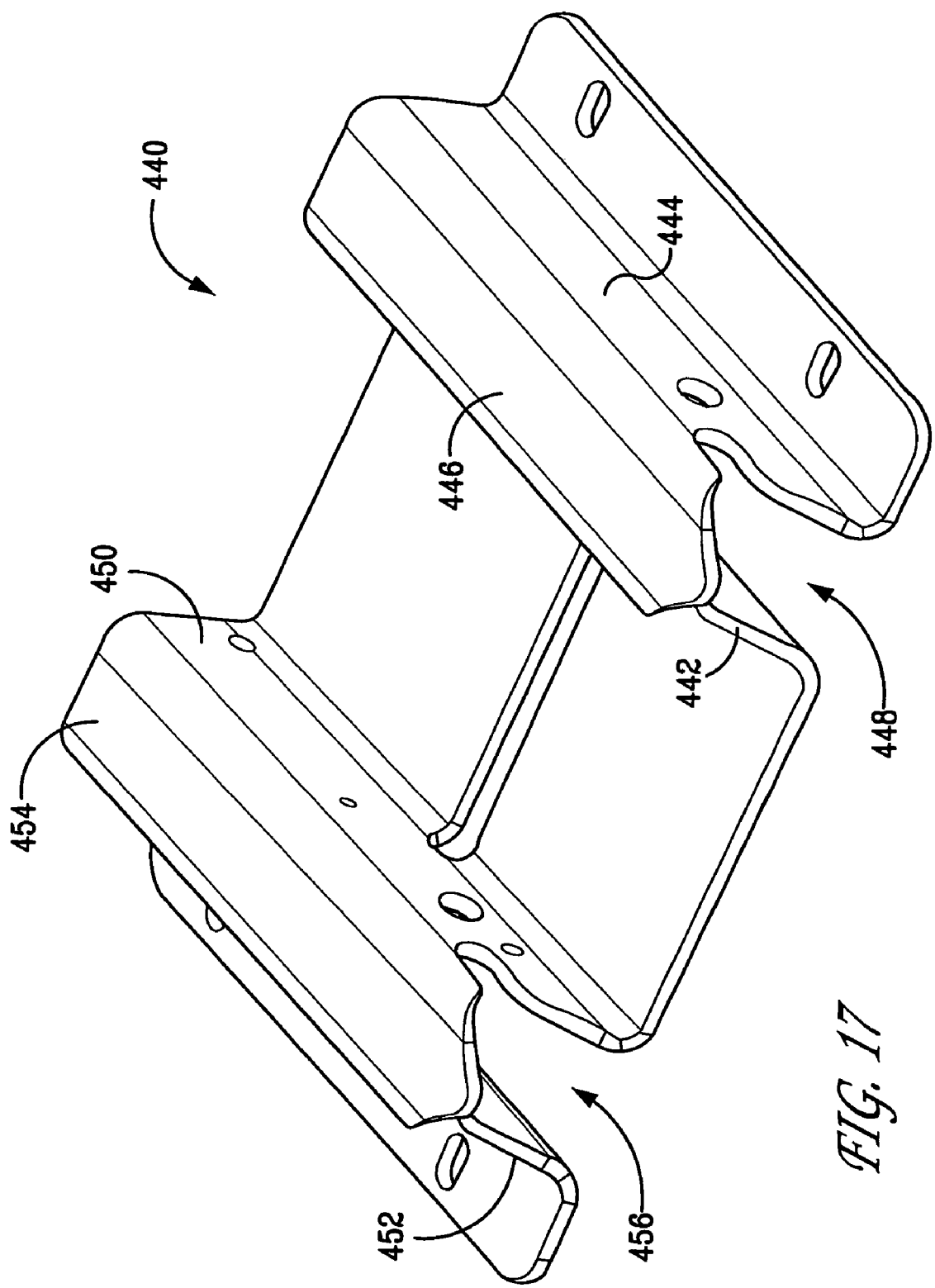
FIG. 17 is a perspective view of an alternative embodiment of a receptacle of the device shown in FIGS. 1A-3B

FIG. 17 depicts an alternative embodiment of the yoke arm 28. In particular, FIG. 17 depicts a yoke arm 440. The yoke arm 440 comprises a first and a second side panel 442, 444, and a first top panel 446 that adjoins the first and second side panels 442, 444. The first and second side panels 442, 444 and the first top panel 446 define a channel 448 that houses the first docking lever 30, the first pawl 112, the first trigger 33, etc.

The yoke arm 440 further comprises a third and a fourth second side panel 450, 452, and a second top panel 454 that adjoins the third and fourth side panels 450, 452. The third and fourth side panels 450, 452 and the second top panel 454 define a channel 456 that houses the second docking lever 32, the second pawl 114, the second trigger 34, etc.

FIGS. 18-28 depict another alternative embodiment of the device 10. In particular, FIGS. 18-28 depict a device 208 comprising a plow bracket 216 and a receptacle 218. (The bracket member 200 can be used in lieu of the plow bracket 216, as discussed above in connection with the device 10.) The receptacle 218 comprises a yoke bracket 228, a first (or master) docking lever 230, and a second (or slave) docking lever 232 (see, e.g., FIGS. 18 and 23). The first and second docking levers 230, 232 are pivotally coupled to the yoke bracket 228, as explained in detail below.

Figure 18:
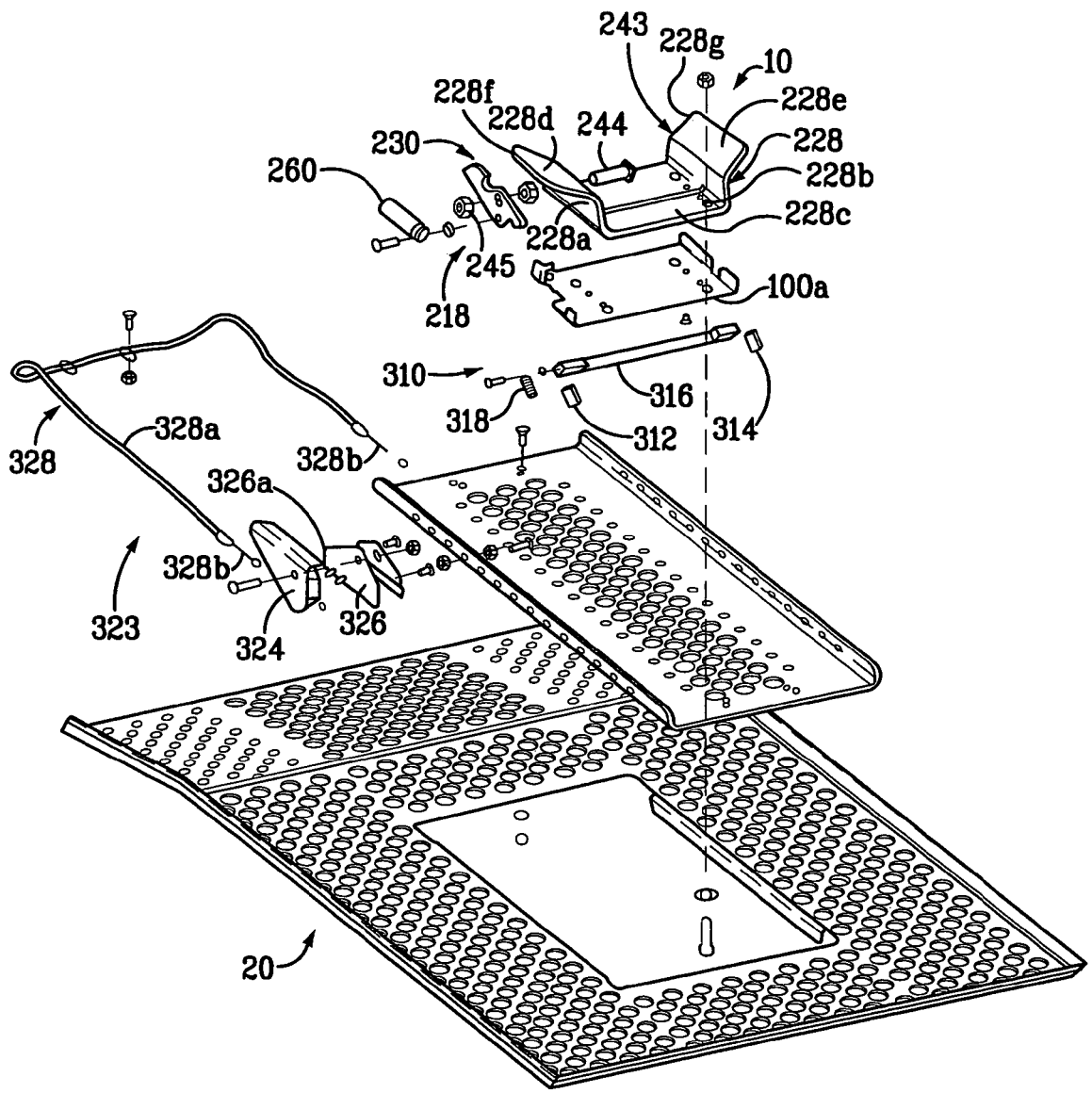
FIG. 18 is an exploded perspective view of a receptacle, a release assembly, and a pawl assembly of an alternative embodiment of the device shown in FIGS. 1A-3B.

The yoke bracket 228 comprises a first and a second side panel 228a, 228b, and a bottom panel 228c (see FIG. 18). The side panels 228a, 228b adjoin opposing ends the bottom panel 228c, and are substantially perpendicular to the bottom panel 228c.

The yoke bracket 228 also comprises a first and a second wing member 228d, 228e. The first and second wing members 228d, 228e adjoin the respective first and second side panels 228a, 228b.

The first wing member 228d comprises a tab portion 228f, and the second wing member 228e comprises a tab portion 228g (see FIG. 18). The tab portions 228f, 228g are each angled outwardly and upwardly (from the perspective of FIG. 18). (It should be noted that alternative embodiments of the yoke bracket 228 can be formed without the tab portions 228f, 228g.)

Figure 22:
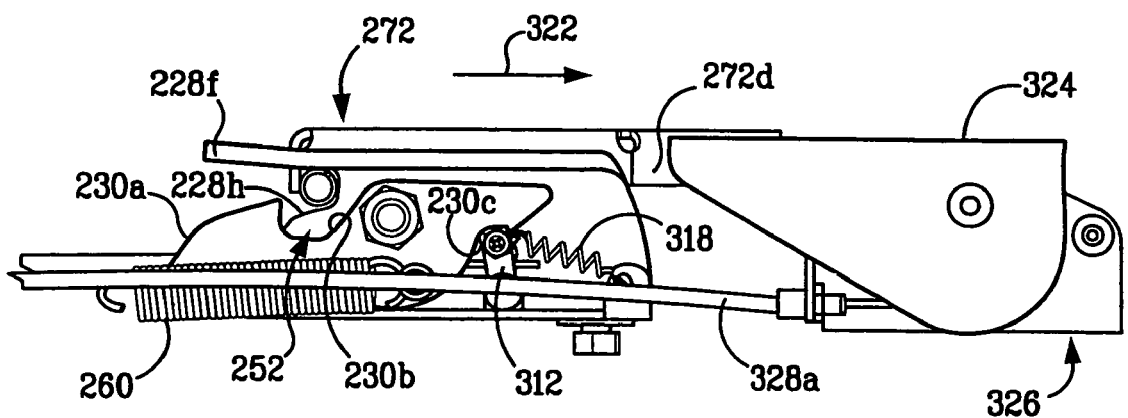
FIG. 22 is a side view of the receptacle, the release assembly, the pawl assembly, and the plow bracket shown in FIGS. 18-21, with the release lever shown in its first position, the first pawl shown in its first position and restrained by the first docking lever, the first docking lever shown in its releasing position, and the plow bracket fully inserted in the receptacle.

The first side panel 228a has a first edge portion 228h, and the second side panel 228b has a first edge portion 228i (see, e.g., FIGS. 22 and 23). The first edge portion 228h defines an open-ended slot 242 (se FIG. 25). The first edge portion 228*i* defines an open-ended slot 243 (see FIGS. 18 and 23).

The first and second docking levers 230, 232 are pivotally coupled to the yoke bracket 228, as previously noted. More particularly, the first docking lever 230 is pivotally coupled to the side panel 228*a* by way of a threaded bolt 244 (see FIG. 18). The bolt 244 is accommodated within through holes formed in each of the side panel 228*a* and the docking lever 230, and is axially restrained by nuts 245 located on opposing sides of the docking lever 230. The second docking lever 232 is pivotally coupled to the side panel 228*b* by a second of the threaded bolts 44. The second bolt 244 is accommodated within through holes formed in each of the side panel 228*b* and the docking lever 232, and is axially restrained by a third and a fourth of the nuts 245, located on opposing sides of the docking lever 232.

The first and second docking levers 230, 232 can pivot between a locking position (see, e.g., FIG. 27) and a releasing position (see, e.g., FIGS. 25 and 26). The docking levers 230, 232 are pivotally biased in a clockwise direction (from the perspective of FIG. 22) by respective springs 260, 262 (see, e.g., FIGS. 15, 22, and 23). In other words, the springs 260, 262 bias the docking levers 230, 232 toward the locking position.

The first docking lever 230 has a first edge portion 230*a*, and a second edge portion 230*b* that adjoins the first edge portion 230*a* (see, e.g., FIG. 22). The second edge portion 230*b* defines a first indentation 252 in the first docking lever 230. The docking lever 232 has a first edge portion 232*a*, and a second edge portion 232*b* that adjoins the first edge portion 232*a* (see, e.g., FIG. 23). The second edge portion 232*b* defines a first indentation 254 in the second docking lever 232. The significance of these features is explained below.

The first docking lever 230 also has a third edge portion 230*c*, and adjoining fourth edge portion 230*d* (see, e.g., FIG. 25). The third and fourth edge portions 230*c*, 230*d* define a second indentation 255 in the first docking lever 230. The second docking lever 232 has a third edge portion 232*c* (see FIG. 23).

The first and second docking levers 230, 232 are restrained from clockwise rotation past their respective locking positions by the tab portions 228*f*, 228*g* on the yoke bracket 228. More particularly, the tab portion 228*f* is located above the first edge 230*a* of the docking lever 230, and intersects the plane of rotation of the docking lever 230 (see, e.g., FIG. 27). Clockwise rotation of the docking lever 230 causes the first edge 230*a* to contact the tab portion 228*f* as the docking lever 230 reaches the locking position. This contact interferes with further clockwise movement of the docking lever 230, and thereby prevents the docking lever 230 from pivoting past its locking position.

The tab portion 228*g* is located above the first edge 232*a* of the docking lever 232, and intersects the plane of rotation of the docking lever 232 (see FIG. 23). Clockwise rotation of the docking lever 232 causes the first edge 232*a* to contact the tab portion 228*g* as the docking lever 232 reaches the locking position. This contact interferes with further clockwise movement of the docking lever 232, and thereby prevents the docking lever 232 from pivoting past its locking position.

The yoke bracket 228 can be mounted on the platform 20 using a mounting bracket 100*a* substantially similar to the mounting bracket 100.

The device 208 also comprises a pawl assembly 310 (see, e.g., FIG. 18). The pawl assembly 310 comprises a first (or master) pawl 312, a second (or slave) pawl 314, a shaft 316, and a spring 318. The first and second side panels 228*a*, 228*b* each have a slot 319 formed therein for receiving the shaft 316 (see, e.g., FIGS. 26 and 28). The first pawl 312 is fixedly coupled to a first end of the shaft 316, outward of the first side panel 228*a*. The second pawl 314 is fixedly coupled to a second end of the shaft 316, outward of the second side panel 228*b*.

The shaft 316 can rotate within the slots 119 formed in the first and second side panels 228*a*, 228*b*. This rotation permits the first and second pawls 312, 314 to each move between a first position (FIGS. 22-25) and a second position (FIGS. 26-28). The spring 318 is coupled to a hook member formed in the mounting bracket 100*a*. The spring 318 biases the first pawl 314 in a clockwise direction (from the perspective of FIG. 22), toward its second position. (The spring 318 also biases the second pawl 314 toward its second position by way of the shaft 316.) The significance of these features is discussed below.

The device 208 also includes a release mechanism 323 (see, e.g., FIG. 18). The release mechanism 323 comprises a release lever 324, a bracket 326, and a cable such as a throttle cable 328. The throttle cable 328 comprises an outer jacket 328*a*, and a cable member 328*b* slidably disposed within the jacket 328*a*. The release lever 324 is pivotally coupled to the bracket 326. The release lever 324 can pivot between a first position (FIGS. 20 and 22) and a second position (FIGS. 19 and 21).

Figure 19:
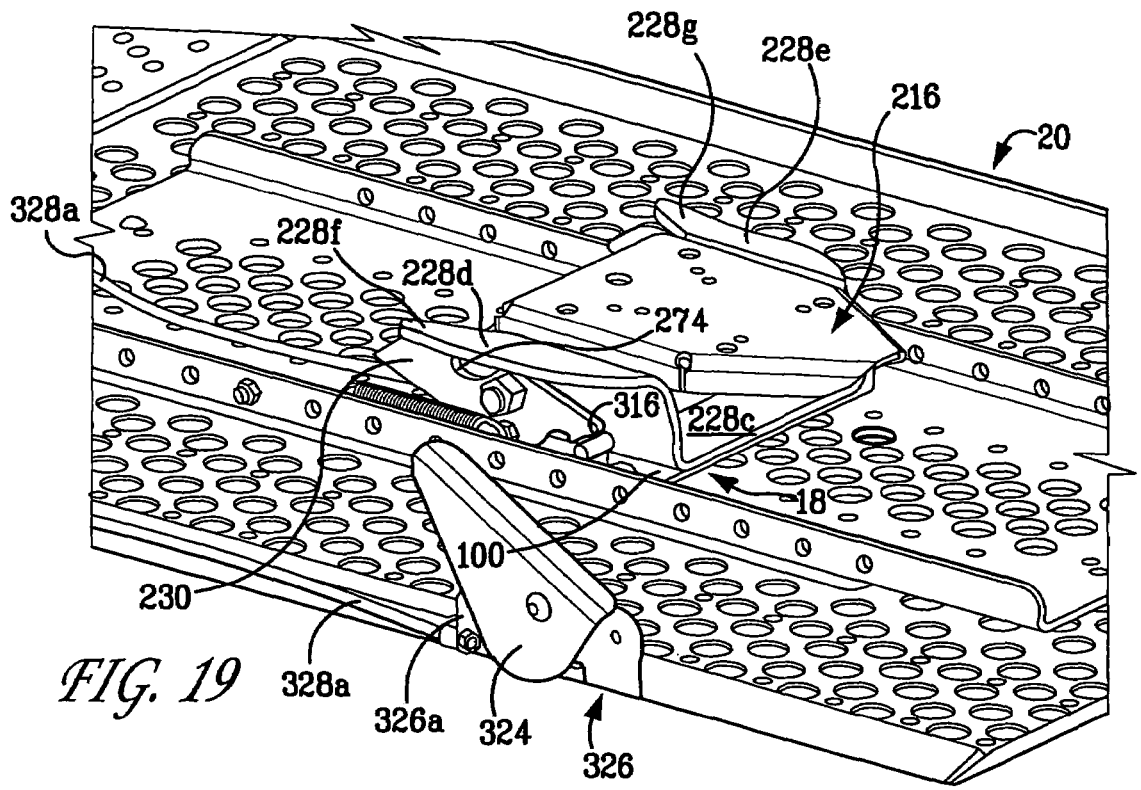
FIG. 19 is a perspective view of the receptacle, the release assembly, and the pawl assembly shown in FIG. 18, and a plow bracket of the alternative embodiment of the device shown in FIGS. 1A-3B mated with the receptacle, with a release lever and a first pawl of the device shown in their respective second positions, and a first docking lever of the receptacle shown in its locking position.
Figure 20:
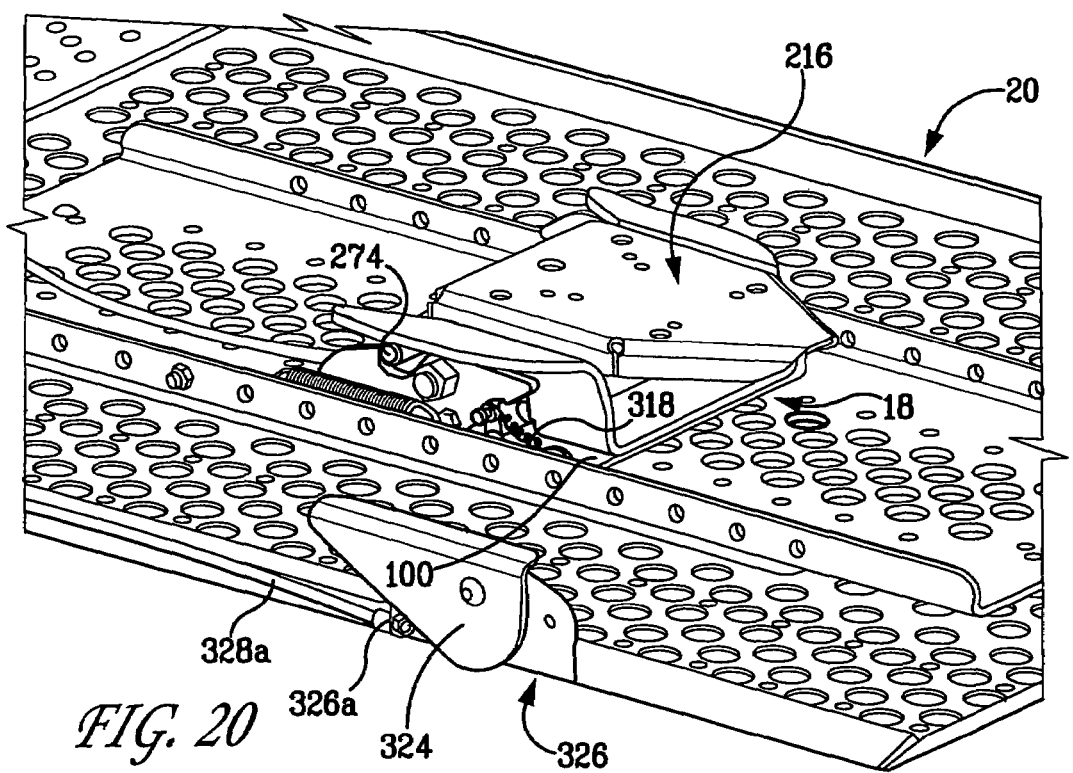
FIG. 20 is a perspective view of the receptacle, the release assembly, the pawl assembly, the plow bracket, and the platform shown in FIGS. 18 and 19, with the release lever and the first pawl shown in their respective first positions, and the first docking lever shown in its releasing position.
Figure 21:
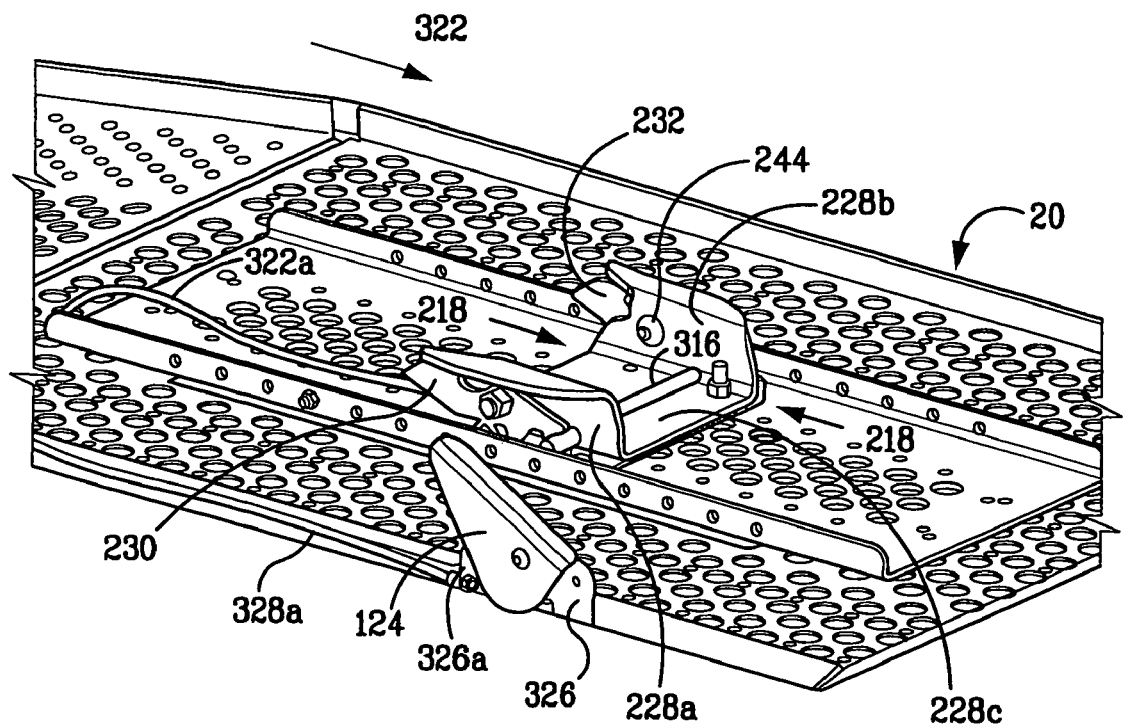
FIG. 21 is a perspective view of the receptacle, the release assembly, the pawl assembly, and the platform shown in FIGS. 18-20, with the release lever and the first pawl shown in their respective second positions, and the first docking lever shown in its locking position.

The bracket 326 can be fixedly coupled to a suitable mounting surface such as an edge of the platform 20 (see FIGS. 19-21). The release lever 324, as explained below, can be depressed by the user to release the plow bracket 216 (and the power chair 14) from the receptacle 218. The bracket 326 and the release lever 324 can be mounted at a suitable location on the platform 20 or the transporting vehicle so as to allow the user to release the power chair 14 from a convenient position, without having to reach under the power chair 14. (The release mechanism 323 can thus function as a remotely-activated release.) The release lever 324 can take the form of a foot lever (as shown) or, for example, a palm pad.

A first end of the cable member 328*b* is fixedly coupled to the release lever 324. A first end of the jacket 328*a* is fixedly coupled to a flange 126*a* formed on the bracket 326 (see FIGS. 18 and 22). A second end of the cable member 328*b* is fixedly coupled to the first pawl 312. A second end of the jacket 328*a* is fixedly coupled to a flange 100*b* formed on the mounting bracket 100.

The throttle cable 328 is preferably adjusted so that movement of the release lever 324 from its second to its first position moves the first pawl 312 from its second position to its first position. (The second pawl 314 moves from its second position to its first position along with the first pawl 312 due to the coupling of the first and second pawls 312, 314 by way of the shaft 316.)

The first and second docking levers 230, 232 are each biased toward their respective locking positions, as noted previously. The power chair 14 can be driven onto the platform 20 in a direction denoted by the arrow 122 in FIGS. 21 and 22 (this direction is hereinafter referred to as the "forward" direction, and the opposing direction is referred to as the "rearward" direction).

The plow bracket 216 is preferably positioned on the power chair 14 so that the first trunnion 274 substantially aligns with and contacts the first edge 230*a* of the first docking lever 230, and the second trunnion 276 substantially aligns with and contacts the first edge 232*a* of the second docking lever 232 as the power chair 14 advances in the forward direction.

Continued movement of the power chair 14 in the forward direction eventually causes the plow bracket 216 to mate with the receptacle 218. More particularly, movement of the power chair 14 in the forward direction causes the plow bracket 216 to become disposed within the yoke bracket 228, i.e., the forward edge 16a of the plow bracket 216 enters the area between the side panels 228a, 228b of the yoke bracket 228 (see FIG. 27).

Further movement of the power chair 14 in the forward direction causes the first and second trunnions 274, 276 to ride along the respective first edges 230a, 232a of the first and second docking levers 230, 232 (see FIG. 25). The contact between the first and second trunnions 274, 276 and the respective first edges 230a, 232a forces (deflects) the first edges 230a, 232a downward (from the perspective of FIG. 25), and thereby causes the first and second docking levers 230, 232 to rotate in a counterclockwise direction.

Continued movement of the first and second trunnions 274, 276 along the respective first edges 230a, 232a eventually causes the first and second trunnions 274, 276 to reach the indentation, 252, 254 in the first and second docking levers 230, 232. The first and second trunnions 274, 276 also enter the slots 42, 43 formed in the respective first and second side panels 228a, 228b of the yoke bracket 228.

The bias exerted on the first and second docking levers 230, 232 by the respective springs 260, 262 causes the first and second docking levers 230, 232 to rotate in a clockwise direction (from the perspective of FIG. 25) when the first and second trunnions 274, 276 reach the indentation, 252, 254 formed in the respective first and second docking levers 230, 232. In other words, the first and second docking levers 230, 232 rotate back toward their respective locking positions when the first and second trunnions 274, 276 reach the respective indentations 252, 254.

Rotation of the first and second docking levers 230, 232 causes the first and second trunnions 274, 276 to become positioned within the respective indentations 252, 254 (see FIG. 25). (It should be noted that the first and second docking levers 230, 232 can rotate independently of each other.) The plow bracket 216 and the receptacle 218 can thus be mated with no action on the part of the user other than driving the power chair 14 (or other personal transport vehicle) onto the platform 20 so that the plow bracket 216 engages the receptacle 218 in the above-noted manner.

Interference between the first trunnion 274, the second edge portion 230b of the first docking lever 230, and the first edge portion 228h of the first side panel 228a can retain the first trunnion 274 within the indentation 252 and the slot 42. More particularly, the first and second edge portions 230a, 230b of the first docking lever 230 form a hook-like structure. This structure, in conjunction with the bias of the spring 260, can inhibit movement of the first trunnion 274 in the rearward direction. Movement of the first trunnion 274 in the forward direction is inhibited by the first edge portion 228h of the bracket 228.

Interference between the second trunnion 276, the second edge portion 232b of the second docking lever 232, and the first edge portion 228i of the yoke bracket 228 can retain the second trunnion 276 within the indentation 254 and the slot 243. More particularly, the first and second edge portions 232a, 232b of the second docking lever 232 form a hook-like structure. This structure, in conjunction with the bias of the spring 262, can inhibit movement of the second trunnion 276 in the rearward direction. Movement of the second trunnion 276 in the forward direction is inhibited by the first edge portion 228i of the bracket 228.

The plow bracket 18 (and the power chair 14) can be released from the receptacle 218 by the release mechanism 323 and the pawl assembly 310. In particular, movement of release lever 324 from its second to its first position causes the first and second pawls 312, 314 to move from their respective second positions to their respective first positions (see FIGS. 22 and 23).

Movement of the first pawl 312 from its second to its first position causes a portion of the first pawl 312 to enter the second indentation 255 formed in the first docking lever 230, as shown in FIG. 22. In particular, the first pawl 312 contacts the third and fourth edge portions 230c, 230d of the first docking lever 230 when the first pawl 312 is in its first position. Contact between the substantially straight fourth edge portion 230d and the first pawl 312 can help to restrain the first pawl 312 in its first position when pressure on the release lever 324 is lessened or eliminated. In other words, the first docking lever 230 can "capture" the first pawl 312 in the second indentation 255, and can thereby inhibit the pawl 312 from returning to its second position in response to the bias of the spring 318.

(It should be noted that the second docking lever 232 does not include an edge portion such as the fourth edge portion 230d. The second docking lever 232 therefore does not restrain the second pawl 314 in manner similar to the first docking lever 230 and the first pawl 312.)

The first and second trunnions 274, 276 cannot clear the respective second edge portions 230b, 232b when the first and second docking levers 230, 232 are positioned as depicted in FIGS. 22 and 23. The curved surfaces of the first and second trunnions 274, 276, however, permit the respective second edge portions 230b, 232b to ride along (and under) the trunnions 274, 276 as the power chair 14 is backed off of the platform 20, i.e., as the power chair 14 is moved in the rearward direction (after the first pawl 312 has been locked in is first position). This contact drives the first docking lever 230 further in the counterclockwise direction, to the position depicted in FIG. 8. (The second docking lever 232 is likewise driven to a similar position not shown in the figures.) The additional rotation of the first and second docking levers 230, 232 permits the trunnions 274, 276 to clear the respective second edge portions 230b, 232b.

The rotation of the first docking lever 230 to the position depicted in FIG. 25 also releases the first pawl 312 from the first docking lever 230, thereby allowing the first and second pawls 312, 314 to return to their respective second positions in response to the bias of the spring 318.

Further movement of the power chair 14 in the rearward direction causes the first and second trunnions 274, 276 to back completely out of the respective indentations 52 54 and the respective slots 42, 43, thereby releasing the plow bracket 216 (and the power chair 14) from the receptacle 218.

The first and second docking levers 230, 232 return to their respective locking positions due to the bias of the respective springs 260, 262 (and because the first and second pawls 312, 314 have returned to their respective second positions, as described above) as the first and second trunnions 274, 276 back away from the first and second docking levers 230, 232.

The power chair 14 (or other personal-transport vehicle) can thus be released from the platform 20 no action on the part of the user other than actuating the release lever 324 and driving (or otherwise moving) the power chair 14 off of the platform 20. Moreover, the receptacle 218 automatically returns to a configuration in which the receptacle 218 is ready to again receive the plow bracket 216.

It should be noted that the first and second docking levers 230, 232 are spring biased in their respective closed positions when the plow bracket 216 is mated with the receptacle 218. This feature can minimize the potential for injuries caused by inadvertently placing a finger, hand, foot, etc. in or near the receptacle 218 when the power chair 14 is not secured thereto.

In other words, the preferred design of the device 208 makes it unlikely that the first and second docking levers 230, 232 will snap shut on a finger, toe, etc. that comes into contact with the receptacle 218.

Alternative embodiments of the releasing mechanism 323 can include an electric motor or solenoid, such as the electric solenoid 118, for moving the first and second pawl 312, 114 between their respective first and second positions.

Figure 29:
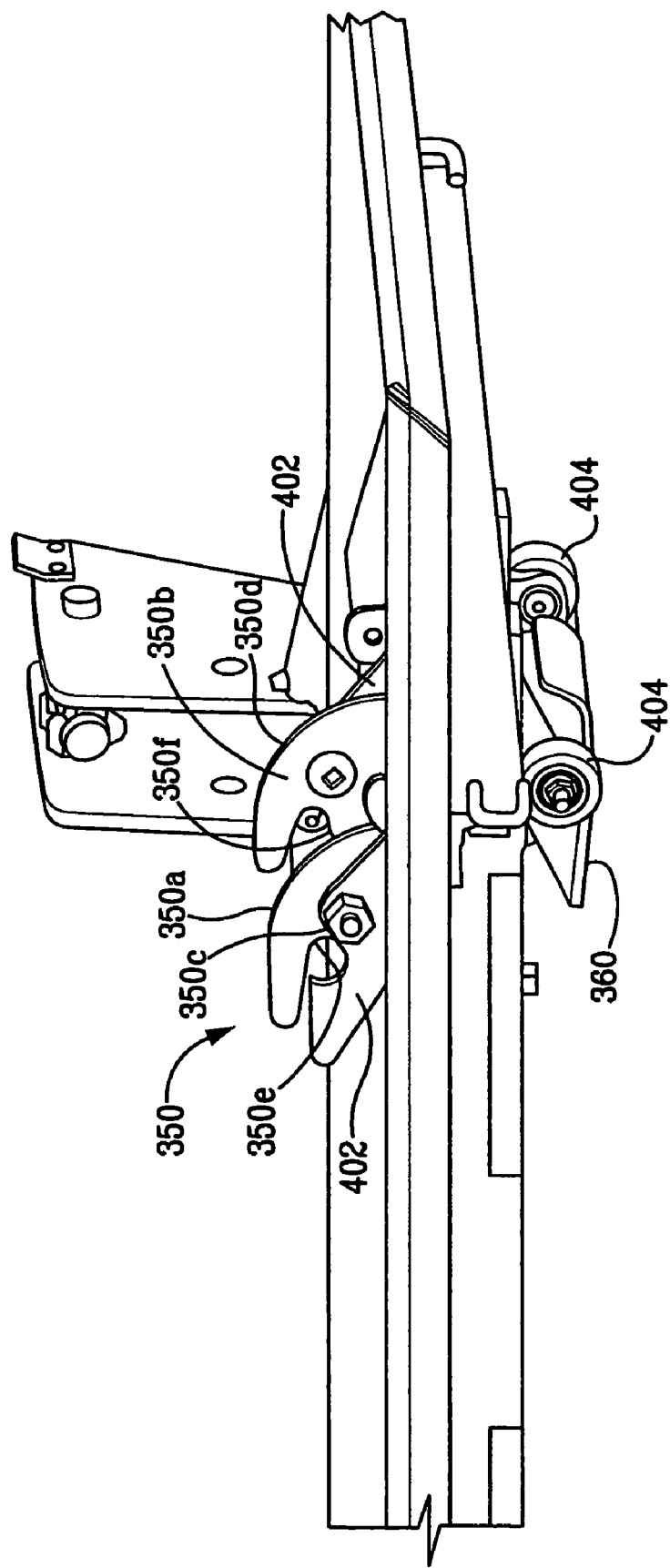
FIG. 29 is a perspective side view of a device comprising an alternative embodiment of the receptacle shown in FIGS. 18-28.

FIG. 29 depicts an alterative embodiment of the yoke bracket 228. In particular, FIG. 17 depicts a hook-type yoke bracket 350 that can be used in lieu of the yoke bracket 228 in the device 208 or other device. The yoke bracket 350 is substantially similar to the yoke bracket 228, with the exception that a first and a second side panel 350a, 350b of the yoke bracket 350 do not have wing members, such as the first and second wing member 228d, 228e, installed thereon. Moreover, the first side panel 350a has a rounded first (upper) edge portion 350c, and the second side panel 350b has a rounded first (upper) edge portion 350d.

(The first side panel 350a has a second (forward) edge portion 150e that is substantially similar to the first edge portion 228h of the first side panel 228a. The second side panel 350b has a second (forward) edge portion 350f that is substantially similar to the first edge portion 228i of the second side panel 228b.)

The yoke bracket 228 has a lower vertical profile than the yoke bracket 350 due to the use of the first and second wing member 228d, 228e thereon. The yoke bracket 228 can therefore be used with personal-transport vehicles having relatively low ground clearance, i.e., with personal transport vehicles whose ground clearance may be insufficient to clear the yoke bracket 350 when the personal-transport vehicle is driven onto the ramp 20.

The alternative embodiment depicted in FIG. 29 also includes docking levers 402 actuated by contact between wheels 404 rotatably coupled thereto, and a ground or floor surface. A device of this type is also disclosed in application Ser. No. 10/126,791, now U.S. Pat. No. 6,837,666, which is incorporated by reference herein in its entirety.

A skid plate 360 is mechanically coupled to the docking levers 202, and can be used to increase the contact area with the ground or floor surface. This feature can be particularly valuable when the ground or floor surface is gravel, stone, sand, or other material that may not provide a sufficient reacting force when the relatively small wheels 204 come into contact therewith.

What is claimed is:

1. A device for securing a personal-transport vehicle to a mounting surface, comprising:
    a bracket member for mounting on one of the personal-transport vehicle and the mounting surface, the bracket member comprising a plate for mounting on one of the personal-transport vehicle and the mounting surface, and a bracket fixedly coupled to the plate;
    a receptacle for mating with the bracket member and comprising (i) a yoke bracket for mounting on the other of the personal-transport vehicle and the mounting surface and receiving the bracket member, the yoke bracket comprising a bottom panel and a first and a second side panel adjoining the bottom panel and each having a slot formed therein, the slots receiving the bracket of the bracket member when the receptacle and the bracket member are mated; and (ii) a first and a second docking lever pivotally coupled to the respective first and second side panels of the yoke bracket and movable between a first position wherein the first and second docking levers can securely engage the bracket member and retain the bracket member in the slots thereby retaining the receptacle and the bracket member in a mated condition, and a second position; and
    a pawl pivotally coupled to the yoke bracket so that the pawl can pivot between an engaged position wherein the pawl restrains the docking lever in the first position, and a disengaged position.

2. The device of claim 1, wherein the first and second docking levers each have an indentation formed therein for receiving the bracket of the bracket member when the first and second docking levers are in the first position, and interference between the bracket of the bracket member and the first and second docking levers retains the bracket of the bracket member in the slots.

3. The device of claim 1, wherein the bracket of the bracket member is substantially U-shaped.

4. A device for securing a personal-transport vehicle to a mounting surface, comprising:
    one of a plow bracket and a bracket member for mounting on one of the personal-transport vehicle and the mounting surface;
    a receptacle for mating with the one of a plow bracket and a bracket member and comprising (i) a yoke bracket for mounting on the other of the personal-transport vehicle and the mounting surface and receiving the one of a plow bracket and a bracket member; and (ii) a docking lever pivotally coupled to the yoke bracket and movable between a first position wherein the lever can securely engage the one of a plow bracket and a bracket member and thereby retain the receptacle and the one of a plow bracket and a bracket member in a mated condition, and a second position;
    a pawl pivotally coupled to the yoke bracket so that the pawl can pivot between an engaged position wherein the pawl restrains the docking lever in the first position, and a disengaged position; and
    a toggle pivotally coupled to the yoke bracket, the toggle rotating to a first position in response to movement of the pawl from the engaged position to the disengaged position, wherein the toggle contacts a pin secured to the pawl when the toggle is in the first position, and the contact between the pin and the toggle inhibits movement of the pawl to the engaged position.

5. A device for securing a personal-transport vehicle to a mounting surface, comprising:
    one of a plow bracket and a bracket member for mounting on one of the personal-transport vehicle and the mounting surface;
    a receptacle for mating with the one of a plow bracket and a bracket member and comprising (i) a yoke bracket for mounting on the other of the personal-transport vehicle and the mounting surface and receiving the one of a plow bracket and a bracket member; and (ii) a docking lever pivotally coupled to the yoke bracket and movable between a first position wherein the lever can securely engage the one of a plow bracket and a bracket member and thereby retain the receptacle and the one of a plow bracket and a bracket member in a mated condition, and a second position; and
    a pawl pivotable between a first and a second position, wherein the pawl urges the docking lever from the first to the second position of the docking lever when the pawl pivots from the first to the second position of the pawl;
    wherein the one of a plow bracket and a bracket member can urge the docking lever from the second to a third position of the lever in response to movement of the one of a plow bracket and a bracket member away from the receptacle as the receptacle and the one of a plow bracket and a bracket member are unmated, and the one of a plow bracket and a bracket member can disengage from the docking lever when the docking lever is in the third position thereby permitting the one of a plow bracket and a bracket member to separate from the receptacle.

6. The device of claim 5, wherein the one of a plow bracket and a bracket member can urge the docking lever from the first to the third position of the docking lever in response to movement of the one of a plow bracket and a bracket member toward the receptacle as the receptacle and the one of a plow bracket and a bracket member are mated so that the one of a plow bracket and a bracket member can enter the yoke bracket.

7. The device of claim 6, wherein movement of the docking lever from the second to the third position of the docking lever causes the docking lever to release the pawl from the second position of the pawl.

8. The device of claim 7, wherein the pawl is biased toward the first position of the pawl and the pawl returns to the first position of the pawl when the docking lever releases the pawl from the second position of the pawl.

9. The device of claim 5, wherein the docking lever has an indentation formed therein for receiving a portion of the one of a plow bracket and a bracket member.

10. The device of claim 9, wherein the docking lever has an edge portion that defines at least a portion of the indentation, and interference between the edge portion and the portion of the one of a plow bracket and a bracket member retains the portion of the one of a plow bracket and a bracket member in the indentation when the docking lever is in the first position of the docking lever.

11. The device of claim 5, wherein the yoke bracket comprises a bottom panel and a first and a second side panel adjoining the bottom panel and each having a slot formed therein, and the receptacle comprises a first and a second of the docking levers pivotally coupled to the respective first and second side panels.

12. The device of claim 5, further comprising a release mechanism for moving the pawl between the first and second positions of the pawl, the release mechanism comprising a cable mechanically coupled to the pawl, and a release lever mechanically coupled to the cable for moving the cable and the pawl on a selective basis.

13. The device of claim 5, further comprising a release mechanism for moving the pawl between the first and second positions of the pawl, the release mechanism comprising an electric solenoid mechanically coupled to the pawl.

14. A device for securing a personal-transport vehicle to a mounting surface, comprising:
one of a plow bracket and a bracket member for mounting on one of the personal-transport vehicle and the mounting surface;
a receptacle for mating with the one of a plow bracket and a bracket member and comprising (i) a yoke bracket for mounting on the other of the personal-transport vehicle and the mounting surface and receiving the one of a plow bracket and a bracket member, the yoke bracket comprising a bottom panel and a first and a second side panel adjoining the bottom panel and each having a slot formed therein; and (ii) a first and a second docking lever pivotally coupled to the respective first and second side panels of the yoke bracket and each being movable between a first position wherein the first and second docking levers can securely engage the one of a plow bracket and a bracket member and thereby retain the receptacle and the one of a plow bracket and a bracket member in a mated condition, and a second position; and
a pawl pivotable between a first and a second position, wherein the pawl urges the first docking lever from the first to the second position of the first docking lever when the pawl pivots from the first to the second position of the pawl.

15. The device of claim 14, wherein the first and second side panels each have a substantially rounded upper edge portion.

16. The device of claim 14, further comprising a second of the pawls and a shaft extending through the yoke bracket and mechanically coupled to the first and the second of the pawls, wherein the second of the pawls urges the second of the docking levers from a first to a second position of the second of the docking levers when the second of the pawls pivots from a first to a second position of the second of the pawls.

17. The device of claim 16, wherein only one of the first and second docking levers has an indentation formed therein for securely receiving a portion of one of the first and second pawls when the one of the first and second pawls is in the second position of the one of the first and second pawls.

18. A device for securing a personal-transport vehicle to a mounting surface, comprising:
one of a plow bracket and a bracket member for mounting on one of the personal-transport vehicle and the mounting surface;
a receptacle for mating with the one of a plow bracket and a bracket member and comprising (i) a yoke bracket for mounting on the other of the personal-transport vehicle and the mounting surface and receiving the one of a plow bracket and a bracket member; and (ii) a docking lever pivotally coupled to the yoke bracket and movable between a first position wherein the docking lever can securely engage the one of a plow bracket and a bracket member and thereby retain the receptacle and the one of a plow bracket and a bracket member in a mated condition, and a second position;
a pawl pivotable between a first and a second position, wherein the pawl urges the docking lever from the first to the second position of the docking lever when the pawl pivots from the first to the second position of the pawl;
a mounting bracket for mounting between the receptacle and the other of the personal-transport vehicle and the mounting surface; and
a spring mechanically coupled to the mounting bracket and the pawl for biasing the pawl toward the first position.

* * * * *